US012696242B2

(12) United States Patent (10) Patent No.: US 12,696,242 B2
Wen et al. (45) Date of Patent: Jul. 28, 2026

(54) METHOD AND APPARATUS FOR SELECTING TRANSMISSION RESOURCE IN INTERNET OF VEHICLES, AND TERMINAL

(71) Applicant: DATANG GOHIGH INTELLIGENT AND CONNECTED TECHNOLOGY (CHONGQING) CO., LTD., High-tech District (CN)

(72) Inventors: Xiaoran Wen, High-tech District (CN); Rui Zhao, High-tech District (CN)

(73) Assignee: DATANG GOHIGH INTELLIGENT AND CONNECTED TECHNOLOGY CO., LTD., Chongqing (CN)

( * ) Notice: Subject to any disclaimer, the term of this patent is extended or adjusted under 35 U.S.C. 154(b) by 325 days.

(21) Appl. No.: 18/284,394

(22) PCT Filed: Mar. 28, 2022

(86) PCT No.: PCT/CN2022/083318
§ 371 (c)(1),
(2) Date: Sep. 27, 2023

(87) PCT Pub. No.: WO2022/206665
PCT Pub. Date: Oct. 6, 2022

(65) Prior Publication Data
US 2024/0172183 A1 May 23, 2024

(30) Foreign Application Priority Data

Mar. 30, 2021 (CN) .......................... 202110342817.7
Mar. 22, 2022 (CN) .......................... 202210286013.4

(51) Int. Cl.
*H04W 72/02* (2009.01)
*H04W 72/0446* (2023.01)
*H04W 76/28* (2018.01)

(52) U.S. Cl.
CPC ....... *H04W 72/02* (2013.01); *H04W 72/0446* (2013.01); *H04W 76/28* (2018.02)

(58) Field of Classification Search
CPC . H04W 72/02; H04W 72/0446; H04W 76/28; H04W 72/40; H04W 4/40; H04W 52/0248; H04W 72/51; H04W 92/18
See application file for complete search history.

(56) References Cited

U.S. PATENT DOCUMENTS

2020/0322100 A1* 10/2020 Cao ...................... H04L 1/1893
2020/0351857 A1 11/2020 Bharadwaj et al.
(Continued)

FOREIGN PATENT DOCUMENTS

CN 111096015 5/2020
CN 111480391 A 7/2020
(Continued)

OTHER PUBLICATIONS

International Search Report for Application No. PCT/CN2022/083318, mailed Jun. 22, 2022 (4 pages).
(Continued)

*Primary Examiner* — Kathy W Wang-Hurst
*Assistant Examiner* — Garth D Richmond
(74) *Attorney, Agent, or Firm* — NIXON PEABODY LLP; Jeffrey L. Costellia

(57) ABSTRACT

The present disclosure discloses a method and apparatus for selecting a transmission resource in the Internet of Vehicles, and a terminal, which relates to the technical field of communications. The method is applied to a first terminal. The method includes: according to a number of transmissions of to-be-transmitted data, Discontinuous Reception (DRX) configuration parameters of a second terminal and resource-pool configuration parameters of the second terminal, selecting candidate transmission resources for the to-be-
(Continued)

transmitted data in a resource selection window; and selecting the transmission resource for the to-be-transmitted data among the candidate transmission resources according to the DRX configuration parameters.

17 Claims, 6 Drawing Sheets

(56)                     References Cited

U.S. PATENT DOCUMENTS

| | | | | |
|---|---|---|---|---|
| 2021/0084660 A1* | 3/2021 | Taherzadeh Boroujeni | ................ | |
| | | | | H04L 5/0057 |
| 2021/0227602 A1* | 7/2021 | Li | ......................... | H04W 76/28 |
| 2021/0298065 A1* | 9/2021 | Awoniyi-Oteri | ...... | H04W 72/23 |
| 2022/0110055 A1* | 4/2022 | Hosseini | ........... | H04W 52/0229 |
| 2023/0068554 A1* | 3/2023 | Yang | ................... | H04W 52/028 |
| 2023/0199728 A1* | 6/2023 | Yoshioka | .............. | H04W 76/14 |
| | | | | 370/329 |
| 2023/0209648 A1* | 6/2023 | Park | ...................... | H04W 72/02 |
| | | | | 370/329 |
| 2023/0239837 A1* | 7/2023 | Ye | ......................... | H04W 72/02 |
| | | | | 370/329 |
| 2023/0354388 A1* | 11/2023 | Ji | ........................... | H04W 72/40 |
| 2024/0080805 A1* | 3/2024 | Lee | ...................... | H04B 17/328 |
| 2024/0172320 A1* | 5/2024 | Ko | ......................... | H04W 4/40 |

FOREIGN PATENT DOCUMENTS

| | | |
|---|---|---|
| CN | 112153602 | 12/2020 |
| CN | 112272397 | 1/2021 |

OTHER PUBLICATIONS

Extended European Search Report for EP Application No. 22778847.8, dated Feb. 25, 2025, (11 pages).
Chinese Office Action in Chinese Application No. CN-202210286013.4 dated Mar. 3, 2025 with English Translation (13 pages).
Resource Allocation for Sidelink Power Saving, 3GPP TSG RAN WG1 #104-e, E-Meeting, dated Jan. 25-Feb. 5, 2021, (14 pages).

* cited by examiner

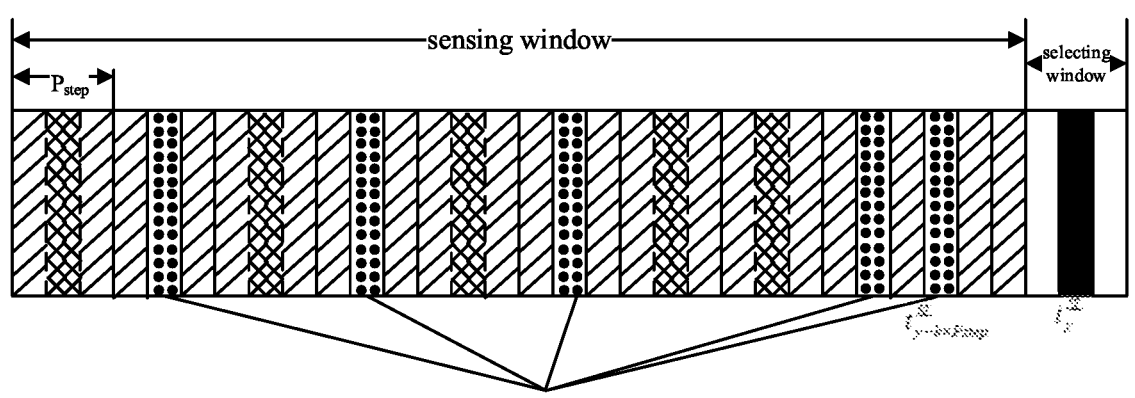

high-level parameter gap CandidateSensing-r14:{1100101010}

FIG. 1

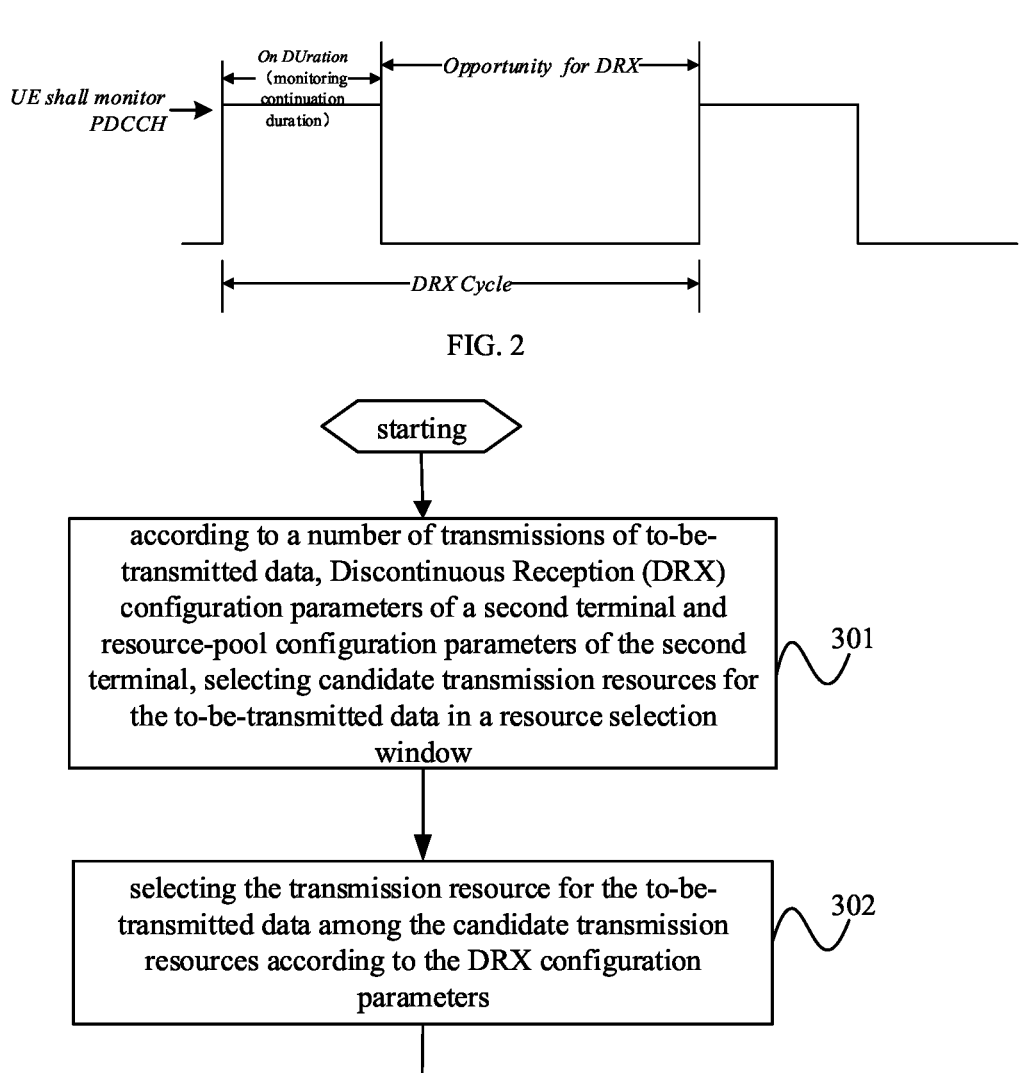

FIG. 2 starting according to a number of transmissions of to-be-transmitted data, Discontinuous Reception (DRX) configuration parameters of a second terminal and resource-pool configuration parameters of the second terminal, selecting candidate transmission resources for the to-be-transmitted data in a resource selection window          301 selecting the transmission resource for the to-be-transmitted data among the candidate transmission resources according to the DRX configuration parameters          302 ending

FIG. 3

METHOD AND APPARATUS FOR SELECTING TRANSMISSION RESOURCE IN INTERNET OF VEHICLES, AND TERMINAL

CROSS REFERENCE TO RELEVANT APPLICATIONS

The present disclosure claims the priorities of the Chinese patent application No. 202110342817.7 filed on Mar. 30, 2021 before the China National Intellectual Property Administration and the Chinese patent application No. 202210286013.4 filed on Mar. 22, 2022 before the China National Intellectual Property Administration, which are incorporated herein in its entirety by reference.

TECHNICAL FIELD

The present disclosure relates to the technical field of communications, and particularly relates to a method and apparatus for selecting a transmission resource in the Internet of Vehicles and a terminal.

BACKGROUND

In New Radio-Vehicle to Everything (NR-V2X), both of the User Equipment (UE) at the transmitting side and the UE at the receiving side have the demand on power saving. In order to satisfy the demand on power saving, the transmitting UE employs a resource selecting method based on partial sensing to perform the channel monitoring and the transmission of the data packets, and the receiving UE employs the approach of Discontinuous Reception (DRX) to perform the receiving of the data packets. However, in such communication scenes, losing of the data packets might happen, which deteriorates the reliability of the service transmission.

SUMMARY

A purpose of the present disclosure is to provide a method and apparatus for selecting a transmission resource in the Internet of Vehicles and a terminal, thereby solving the problem in the related art that the reliability of the service transmission cannot be ensured.

In the first aspect, an embodiment of the present disclosure provides a method for selecting a transmission resource, applied to a first terminal, wherein the method comprises:

according to a number of transmissions of to-be-transmitted data, Discontinuous Reception (DRX) configuration parameters of a second terminal and resource-pool configuration parameters of the second terminal, selecting candidate transmission resources for the to-be-transmitted data in a resource selection window; and selecting the transmission resource for the to-be-transmitted data among the candidate transmission resources according to the DRX configuration parameters.

Optionally, the step of, selecting the transmission resource for the to-be-transmitted data among the candidate transmission resources according to the DRX configuration parameters comprises:

selecting an initial-transmission resource and N−1 retransmission resources for the to-be-transmitted data among the candidate transmission resources;

or selecting N transmission resources for the to-be-transmitted data among the candidate transmission resources;

wherein N refers to the number of transmissions.

Optionally, the step of selecting the initial-transmission resource for the to-be-transmitted data among the candidate transmission resources comprises:

selecting the initial-transmission resource among the candidate transmission resources according to a DRX active time of the second terminal after a time instant n, wherein n is an arrival time of the to-be-transmitted data, or n is a triggering time of resource selection or re-selection.

Optionally, the step of selecting the N−1 retransmission resources for the to-be-transmitted data among the candidate transmission resources a comprises:

determining an active time of a DRX retransmission timer that is expected to be started by the second terminal according to the initial-transmission resource that is selected and/or the DRX configuration parameters; and selecting the retransmission resources among the candidate transmission resources according to an active time of the second terminal, wherein the active time comprises at least the active time of the DRX retransmission timer that is expected to be started by the second terminal.

Optionally, the step of selecting the N−1 retransmission resources for the to-be-transmitted data among the candidate transmission resources comprises:

determining an active time of a DRX retransmission timer that is expected to be started by the second terminal according to the retransmission resources that are selected and/or the DRX configuration parameters; and selecting the retransmission resources among the candidate transmission resources according to an active time of the second terminal, wherein the active time comprises at least the active time of the DRX retransmission timer that is expected to be started by the second terminal.

Optionally, the step of selecting the N transmission resources for the to-be-transmitted data among the candidate transmission resources comprises:

selecting N transmission resources among the candidate transmission resources;

according to the N transmission resources and/or the DRX configuration parameters, determining an active time of a DRX retransmission timer that is expected to be started by the second terminal;

if at least M transmission resources among the N transmission resources are located within the active time of the second terminal, determining the N transmission resources to be the transmission resources for transmitting the to-be-transmitted data, wherein the active time comprises at least the N−1 active times; and if at least M transmission resources among the N transmission resources are not located within the active time, re-selecting N transmission resources among the candidate transmission resources;

wherein M is a positive integer smaller than or equal to N.

Optionally, the candidate transmission resources include:

Y candidate slots, wherein at least some of the Y candidate slots are located within a DRX active time of the second terminal after a time instant n, and Y is greater than or equal to a minimum number of candidate slots that are configured by a network or pre-configured;

or

N candidate-transmission-resource groups, wherein a first candidate-transmission-resource group is located within the DRX active time of the second terminal after the time instant n;

wherein N refers to the number of transmissions, and n is an arrival time of the to-be-transmitted data, or n is a triggering time of resource selection or re-selection.

Optionally, if the candidate transmission resources include the Y candidate slots, the step of, according to the number of transmissions of the to-be-transmitted data, the Discontinuous Reception (DRX) configuration parameters of the second terminal and the resource-pool configuration parameters of the second terminal, selecting the candidate transmission resources for the to-be-transmitted data in the resource selection window comprises:

determining a time-domain starting position of the candidate transmission resources as n+T1+X, wherein n+T1+X is located within the DRX active time of the second terminal after the time instant n, n+T1 is a starting time of the resource selection window, and X is a first slot interval.

Optionally, if the candidate transmission resources include the N candidate-transmission-resource groups, the step of, according to the number of transmissions of the to-be-transmitted data, the Discontinuous Reception (DRX) configuration parameters of the second terminal and the resource-pool configuration parameters of the second terminal, selecting the candidate transmission resources for the to-be-transmitted data in the resource selection window comprises:

determining a time-domain starting position of the first candidate-transmission-resource group as n+T1+X, wherein the first candidate-transmission-resource group is located within the DRX active time of the second terminal after the time instant n, n+T1 is a starting time of the resource selection window, and X is a first slot interval;

according to the DRX configuration parameters and the resource-pool configuration parameters, determining the other N−1 candidate-transmission-resource groups than the first candidate-transmission-resource group; and if it is determined that the last slot of an N-th candidate-transmission-resource group exceeds an ending time of the resource selection window, adjusting at least one of the following parameters:

a quantity of slots within the candidate-transmission-resource groups;

slot intervals between two neighboring instances of the candidate-transmission-resource groups; and a starting position of the first candidate-transmission-resource group.

Optionally, if the candidate transmission resources include Y candidate slots, the step of, selecting the transmission resource for the to-be-transmitted data among the candidate transmission resources according to the DRX configuration parameters comprises:

selecting one initial-transmission resource among the candidate transmission resources, wherein the initial-transmission resource is located within a DRX active time of the second terminal after a time instant n; and selecting N−1 retransmission resources among the candidate transmission resources, wherein the retransmission resources are located within an active time of the second terminal, and the active time is a time duration that is decided according to the DRX configuration parameters.

Optionally, if the candidate transmission resources include N candidate-transmission-resource groups, the step of, selecting the transmission resource for the to-be-transmitted data among the candidate transmission resources according to the DRX configuration parameters comprises:

selecting one initial-transmission resource from a first candidate-transmission-resource group; and selecting N−1 retransmission resources from N−1 candidate-transmission-resource groups other than the first candidate-transmission-resource group, wherein the retransmission resources are located within an active time of the second terminal, and the active time is a time duration that is decided according to the DRX configuration parameters.

Optionally, if the candidate transmission resources include Y candidate slots, the step of, selecting the transmission resource for the to-be-transmitted data among the candidate transmission resources according to the DRX configuration parameters comprises:

selecting N transmission resources from the Y candidate slots;

if at least M transmission resources among the N transmission resources are located within an active time of the second terminal, determining the N transmission resources to be the transmission resources for transmitting the to-be-transmitted data, wherein the active time is a time duration that is decided according to the DRX configuration parameters and/or the N transmission resources; and if at least M transmission resources among the N transmission resources are not located within the active time, re-selecting N transmission resources from the Y candidate slots;

wherein M is a positive integer smaller than or equal to N.

Optionally, if the candidate transmission resources include N candidate-transmission-resource groups, the step of, selecting the transmission resource for the to-be-transmitted data among the candidate transmission resources according to the DRX configuration parameters comprises:

selecting one transmission resource from each of candidate-transmission-resource groups;

if at least M transmission resources among N transmission resources are located within an active time of the second terminal, determining the N transmission resources to be the transmission resources for transmitting the to-be-transmitted data, wherein the active time is a time duration that is decided according to the DRX configuration parameters and/or the N transmission resources; and if at least M transmission resources among the N transmission resources are not located within the active time, re-selecting one transmission resource from each of the candidate-transmission-resource groups;

wherein M is a positive integer smaller than or equal to N.

In the second aspect, an embodiment of the present disclosure further provides a terminal, wherein the terminal is a first terminal, and comprises a transceiver, a memory, a processor and a computer program stored in the memory and executed in the processor, and the processor, when executing the computer program, implements the steps of the method for selecting a transmission resource in the first aspect.

In the third aspect, an embodiment of the present disclosure further provides an apparatus for selecting a transmission resource, applied to a first terminal, wherein the apparatus comprises:

a first selecting module configured for, according to a number of transmissions of to-be-transmitted data, Discontinuous Reception (DRX) configuration parameters of a second terminal and resource-pool configuration parameters of the second terminal, selecting candidate transmission resources for the to-be-transmitted data in a resource selection window; and a second selecting module configured for, selecting the transmission resource for the to-be-transmitted data among the candidate transmission resources according to the DRX configuration parameters.

In the fourth aspect, an embodiment of the present disclosure further provides a computer-readable storage medium, wherein the computer-readable storage medium stores a computer program, and the computer program, when executed by a processor, implements the steps of the method for selecting a transmission resource in the first aspect.

The above technical solutions of the present disclosure have at least the following advantageous effects:

In the method for selecting a transmission resource according to the embodiments of the present disclosure, firstly, the first terminal, according to the number of transmissions of the to-be-transmitted data, the Discontinuous Reception (DRX) configuration parameters of the second terminal and the resource-pool configuration parameters of the second terminal, selects the candidate transmission resources for the to-be-transmitted data in the resource selection window; and secondly, the first terminal further, according to the DRX configuration parameters, among the candidate transmission resources, selects the transmission resource for the to-be-transmitted data. Accordingly, when the first terminal is selecting the transmission resource for the to-be-transmitted data, the DRX configuration of the second terminal is sufficiently taken into consideration, so that the selected transmission resource can be located within the active time of the second terminal, thereby reducing packet loss in the process of data transmission, whereby the terminal can ensure the reliable transmission of the data transmission while reducing the power consumption.

BRIEF DESCRIPTION OF THE DRAWINGS

FIG. 1 is a schematic diagram of the partial-sensing mechanism;

FIG. 2 is a schematic diagram of the fundamental principle of DRX;

FIG. 3 is a first schematic flow chart of a method for selecting a transmission resource according to an embodiment of the present disclosure;

DETAILED DESCRIPTION

Figure 4:
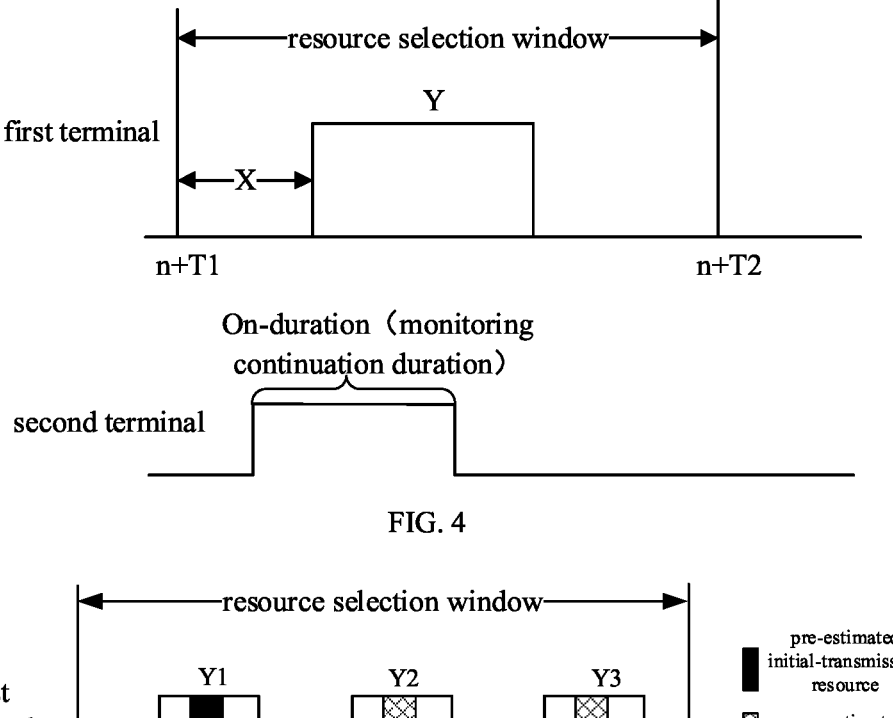
FIG. 4 is a first schematic diagram of the selection of the candidate transmission resources according to an embodiment of the present disclosure.

In order to make the technical problem sought to solve, the technical solutions and the advantages of the present disclosure clearer, detailed description will be performed below with reference to the drawings and the particular embodiments. In the following description, the particular details of the particular configurations and components are provided merely in order to facilitate to completely comprehend the embodiments of the present disclosure. Therefore, a person skilled in the art should understand that the embodiments described herein may have various variations and modifications without departing from the scope and spirit of the present disclosure. Furthermore, in order for clarity and brevity, the descriptions on known functions and structures are omitted.

It should be understood that the "one embodiment" or "an embodiment" as used throughout the description means that particular features, structures or characteristics with respect to the embodiments are included in at least one embodiment of the present disclosure. Therefore, the "in one embodiment" or "in an embodiment" as used throughout the description does not necessarily refer to the same embodiment. Furthermore, those particular features, structures or characteristics may be combined in one or more embodiments in any suitable form.

In the embodiments of the present disclosure, it should be understood that the sequence of the serial numbers of the steps below do not indicate the sequence of the execution thereof, and the sequence of the execution of the steps should be decided according to their functions and internal logic, and should not limit the implementation of the embodiments of the present disclosure in any manner.

In the embodiments of the present disclosure, it should be understood that "B corresponding to A" represents that B is associated with A, and B can be determined according to A. However, it should also be understood that that B is determined according to A does not indicate that B is determined merely according to A, but B may also be determined according to A and/or other data.

For the description on the embodiments of the present disclosure, firstly some concepts used in the following description will be explained.

The first: partial sensing

The 3rd Generation Partnership Project Release 14 Long Term Evolution Vehicle to Everything (3GPP R14 LTE V2X) introduces new characteristics supporting wearable terminals (Pedestrian-User Equipment, P-UE). Taking into consideration the problem of the power consumption caused by continuous reception of the P-UE, the precondition of designing the 3GPP R14 LTE V2X standard is to assume that the application layer of the P-UE is not required to continuously receive the PC5 V2X messages of other UEs; in other words, the P-UE merely transmits data and does not receive data, to achieve the goal of power saving. The sensing process of the P-UE is partial sensing. The partial sensing mechanism is shown in FIG. 1. The P-UE, according to the minimum quantity Y of the candidate sub-frames of the network configuration (Y is configured by using the high-level parameter minNumCAndidateSF-r14), determines the positions of Y sub-frames in the resource selection window. By monitoring the result of the resource occupation on the sub-frame $$t_{y-k \times Pstep}^{SL},$$

it is determined whether the candidate sub-frames $$t_y^{SL}$$

are available. The set of the k values is determined by using the parameter gapCandidateSensing-r14 of the network configuration. If the k-th bit of the gapCandidateSensing-r14 is 1, then the monitoring is performed, or else no monitoring is performed.

The second: discontinuous reception DRX

In mobile communication systems based on shared channels, for example, in the Long Term Evolution (LTE) technique, the transmission of the uplink and downlink data is controlled by a base station (eNB) dispatcher. When the dispatcher decides to dispatch a certain user, it notifies the terminal by using the control channel on which resource the data are sent or received. The terminal (UE) monitors the control channel, and, when it is detected that the dispatching information contain itself, according to the instruction by the control channel, completes the transmitting (uplink) or receiving (downlink) of the data. In the activation state, because the terminal does not know when the eNB dispatches it, a commonly used operation mode is that the terminal continuously monitors the control channel, and parses all of the sub-frames that contain its downlink dispatching control channel, to determine whether it is dispatched. Such an operation mode can obtain a high efficiency if the terminal has a high data volume and might be frequently dispatched. However, regarding some services, the arrival frequency of the data is low, which causes that the terminal is dispatched with a low time quantity, and if the terminal still continuously monitors the control channel, undoubtedly its power consumption is increased. In order to solve the problem of electricity consumption, the LTE system employs the DRX operation mode, and in such an operation mode, the terminal monitors the control channel periodically, to achieve the goal of power saving.

The third: the fundamental principle of Drx

The fundamental principle of DRX is shown in FIG. 2. The monitoring continuation duration on-duration represents the time period during which the terminal UE monitors the control channel, and during it the radio-frequency channel is opened, and the control channel is continuously monitored. Within other durations than the on-duration, the UE is in the sleeping state, its radio-frequency link is closed, and the control channel is no longer monitored, to achieve the goal of power saving. The on-duration appears periodically (Cycle), and the particular period is configured by the eNB.

The DRX mechanism of honeycomb networks takes into consideration the arrival model of data services; in other words, the arriving of data packets is bursty (which may be understood as that, once data packets arrive, a large quantity of packets continuously arrive within a short time). In order to adapt for such a service arrival characteristic, the DRX process of LTE employs multiple types of timers, and cooperates with the process of hybrid automatic repeat request (HARD), so as to reach a better electricity-saving performance.

The fourth: the timers related to DRX mainly include:

1. DRX on-duration timer (drx-onDurationTimer): the time when the UE periodically awakens to monitor the control channel.

2. Short DRX period timer (Short DRX cycle Timer): in order to better match the arrival characteristic of data services, honeycomb-network communication systems support to configure two types of DRX cycles: a long cycle and a short cycle. The on-duration timers of the two types of cycles are the same, but the sleeping durations are different. In the short cycle, the sleeping duration is shorter, and the UE can more quickly monitor the control channel again. The long cycle must be provided, and is the initial state of the DRX process. The short cycle is optional. The short DRX cycle timer sets the duration during which the short cycle continues. After the Short cycle timer is overtime, the UE uses the long cycle.

3. DRX inactivity timer (drx-InactivityTimer): after the DRX is configured, when the UE receives the controlling signaling initially transmitted by the HARQ within the duration during which it is allowed to monitor the control channel (Active Time), the timer is started, and before the timer is overtime, the UE continuously monitors the control channel. If, before the drx-InactivityTimer is overtime, the UE receives the controlling signaling initially transmitted by the HARQ, the drx-InactivityTimer is terminated and restarted.

4. HARQ RTT Timer: including drx-HARQ-RTT-TimerDL and drx-HARQ-RTT-TimerUL, whose purpose is to enable the UE to probably not monitor the control channel before the next time of retransmission, to reach a better effect of power saving. Taking downlink as an example, the first symbol after the transmission of the Physical Uplink Control Channel (PUCCH) in the relevant process of the UE is started, to start the timer. If the data in the corresponding HARQ process are not successfully decoded after the HARQ transmission in the preceding time (the UE sends the NACK feedback), after the drx-HARQ-RTT-TimerDL is overtime, the UE starts the drx-RetransmissionTimerDL. If the data in the corresponding HARQ process are successfully decoded after the HARQ transmission in the preceding time (the UE sends the ACK feedback), after the drx-HARQ-RTT-TimerDL timer is overtime, the UE does not start the drx-RetransmissionTimerDL. If currently merely the drx-HARQ-RTT-TimerDL is operating, the UE does not monitor the control channel.

5. HARQ retransmission timer (HARQ retransmission Timer): including a DRX downlink retransmission timer (drx-RetransmissionTimerDL) and a DRX uplink retransmission timer (drx-RetransmissionTimer UL). Taking downlink as an example, during the operation of the drx-RetransmissionTimerDL, the UE monitors the controlling signaling, and waits for the retransmission dispatching of the corresponding HARQ process.

The fifth: regarding the definition on the activity time/active time ((Active time) in DRX If anyone timer of the drx-onDurationTimer, the HARQ retransmission Timer and the Inactivity Timer is running, the second terminal monitors the control channel. The duration during which the second terminal monitors the control channel is also referred to as the Active Time.

In the LTE system, the Active Time is not only influenced by the DRX timer, but is also influenced by other factors. The Active Time of the LTE Rel-8 UE comprises the following durations:

(1) the duration during which the drx-onDurationTimer, the drx-InactivityTimer, the drx-RetransmissionTimerDL, the drx-RetransmissionTimerUL or a competition solving timer (ra-ContentionResolutionTimer) runs;

(2) the duration during which the UE, after transmitting an uplink dispatching request (Scheduling Request, SR), waits for the base station to transmit a Physical Downlink Control Channel (PDCCH); and (3) the duration during which a non-competitive randomly accessed UE, after receiving a Random Access Response (RAR), waits for the PDCCH dispatched by a Cell Radio Network Temporary Identifier (C-RNTI).

It should be noted that the calculation on the on-duration in the Common DRX may be as follows:

(1) for the short DRX cycle, the calculation formula of the on-duration is as follows:

$$[SFN \times 10 + \text{subframe number}] \bmod o(\text{shortDRX\_Cycle}) = (\text{drxStartOffset}) \bmod o (\text{shortDRX\_Cycle}); \text{ and}$$

(2) for the long DRX cycle, the calculation formula of the on-duration is as follows:

$$[SFN \times 10 + \text{subframe number}] \bmod o (\text{LongDRX\_Cycle}) = (\text{drxStartOffset});$$

wherein SFN is the SFN serial number of the current wireless frame; subframe number is the serial number of the current sub-frame; shortDRX_Cycle is the short DRX cycle; longDRX_Cycle is the long DRX cycle; and drxStartOffset is a deviation value of the RRC signaling configuration.

Particularly, the embodiments of the present disclosure provide a method, apparatus and terminal for selecting a transmission resource in the Internet of Vehicles, which solves the problem in the related art that, in communication scenes in which both of the UEs at the transmitting side and the receiving side have the demand on power saving, losing of the data packets might happen, which deteriorates the reliability of the service transmission. The embodiments of the present disclosure may be applied to communication scenes in which both of the UEs at the transmitting side and the receiving side have the demand on power saving. Particularly, the communication scenes in which both of the UEs at the transmitting side and the receiving side have the demand on power saving may include a Peer to Peer (P2P) communication scene, but are not limited thereto.

The First Embodiment

As shown in FIG. 3, an embodiment of the present disclosure provides a method for selecting a transmission resource, applied to a first terminal. The method particularly comprises the following steps:

Step 301: according to a number of transmissions of to-be-transmitted data, Discontinuous Reception DRX configuration parameters of a second terminal and resource-pool configuration parameters of the second terminal, selecting candidate transmission resources for the to-be-transmitted data in a resource selection window.

In this step, the number of transmissions comprises the initial transmission and multiple times of retransmission of the next transport block (TB) of the to-be-transmitted service of the first terminal.

Here, it should be noted that the DRX configuration parameters are a group of DRX configuration parameters, and include at least the time period during which the UE monitors the sidelink (in order to facilitate the description, in the present disclosure the time period during which the UE monitors the sidelink is referred to as the DRX active time) (for example, the duration during which drx-onDurationTimer, drx-InactivityTimer and drx-RetransmissionTimerSL run), the time period during which the UE does not monitor sidelink (for example, the duration during which drx-HARQ-RTT-TimerSL runs) and the period of DRX (for example, drx-Cycle). The terminal awakens at the starting positions of the on-duration of each of the DRX periods to start the drx-onDurationTimer, i.e., starting to monitor the control channel.

Here, it should also be noted that the DRX configuration parameters may be configured in any one of the following modes:

a group of DRX parameters that are configured for the second terminal by the network side;

a group of DRX configuration parameters selected by the second terminal from multiple groups of DRX configuration parameters configured by the network side;

a group of DRX parameters configured by the second terminal itself and informed to the network side;

a group of DRX parameters determined (according to a pre-configuration) by the second terminal itself and reported to the first terminal established with connection in advance; and a group of DRX configuration parameters configured for the second terminal by the first terminal established with connection in advance.

Furthermore, the first terminal may acquire the DRX configuration parameters of the second terminal by requesting the network side, or directly acquire the DRX configuration parameters of the second terminal established with connection in advance.

In this step, the resource selection window refers to a resource selection window determined by the first terminal according to the result of resource sensing, wherein the resource selection window refers to the time period from n+T1 to n+T2, wherein n is an arrival time of the to-be-transmitted data, or n is a triggering time of resource selection or re-selection, wherein the triggering time of the resource selection or re-selection refers to the moment when the resource selection or re-selection is triggered for the to-be-transmitted data; $0 \leq T_1 \leq T_{proc,1}$, and $T_{proc,1}$ represents the transmitting processing delay of the first terminal; and $T_{2min} \leq T_2 \leq D_i$, and $T_{2min}$ is the minimum value of $T_2$ of the high-level configuration, and $D_i$ is the maximum tolerated delay of a periodic service.

Furthermore, it should also be noted that the resource selection window comprises the DRX active time of the second terminal after a time instant n, wherein n is an arrival time of the to-be-transmitted data, or n is a triggering time of resource selection or re-selection, wherein the triggering time of the resource selection or re-selection refers to the moment when the resource selection or re-selection is triggered for the to-be-transmitted data.

Step 302: selecting the transmission resource for the to-be-transmitted data among the candidate transmission resources according to the DRX configuration parameters.

In this step, according to the DRX configuration parameters, among the candidate transmission resources, the transmission resource for the to-be-transmitted data is selected, so that the selected transmission resource can be located within the active time of the second terminal, which reduces losing of the data packets, thereby improving the reliability of the data transmission. Particularly, this step may comprise: according to the DRX configuration parameters, determining the active time of the second terminal, and further determining whether the selected transmission resource is located within the active time; and if the selected transmission resource is not located within the active time, then re-selecting the transmission resource, till the selected transmission resource is located within the active time of the second terminal. In other words, this step may comprise, selecting the transmission resource for the to-be-transmitted data among the candidate transmission resources according to the DRX configuration parameters, whereby the selected transmission resource is located within the active time of the second terminal.

In the method for selecting a transmission resource according to the embodiments of the present disclosure, firstly, the first terminal, according to the number of transmissions of the to-be-transmitted data, the Discontinuous Reception DRX configuration parameters of the second terminal and the resource-pool configuration parameters of the second terminal, selects the candidate transmission resources for the to-be-transmitted data in the resource selection window; and secondly, the first terminal further, according to the DRX configuration parameters, among the candidate transmission resources, selects the transmission resource for the to-be-transmitted data. Accordingly, when the first terminal is selecting the transmission resource for the to-be-transmitted data, the DRX configuration of the second terminal is sufficiently taken into consideration, so that the selected transmission resource is within the active time of the second terminal, thereby reducing packet loss in the process of data transmission, whereby the terminal can ensure the reliable transmission of the data while reducing the power consumption.

As an alternative implementation, the step 302 of, selecting the transmission resource for the to-be-transmitted data among the candidate transmission resources according to the DRX configuration parameters comprises:

selecting an initial-transmission resource and N−1 retransmission resources for the to-be-transmitted data among the candidate transmission resources;

or selecting N transmission resources for the to-be-transmitted data among the candidate transmission resources; wherein N refers to the number of transmissions.

In other words, in the present alternative implementation, the mode of selecting the transmission resource may comprise firstly selecting one initial-transmission resource, and subsequently selecting N−1 retransmission resources, wherein the initial-transmission resource refers to the resource used for the first time of transmission, and the retransmission resources refer to the resources used for the subsequent transmission. Alternatively, the mode of selecting the transmission resource may also comprise selecting N transmission resources one time. The two modes of selecting the transmission resource described above will be described below:

In a first mode, the step of, among the candidate transmission resources, selecting the initial-transmission resource and the N−1 retransmission resources for the to-be-transmitted data particularly comprises: two steps of, selecting the initial-transmission resource for the to-be-transmitted data among the candidate transmission resources, and selecting the N−1 retransmission resources for the to-be-transmitted data among the candidate transmission resources.

Particularly, the step of selecting the initial-transmission resource for the to-be-transmitted data among the candidate transmission resources comprises:

selecting the initial-transmission resource among the candidate transmission resources according to a DRX active time of the second terminal after a time instant n, wherein n is an arrival time of the to-be-transmitted data, or n is a triggering time of resource selection or re-selection.

For example, this step may comprise, according to the first on-duration time duration of the second terminal after the time instant n, selecting the initial-transmission resource among the candidate transmission resources.

Particularly, the step of selecting the N−1 retransmission resources for the to-be-transmitted data among the candidate transmission resources may comprise the following two implementations:

The implementation (1): determining an active time of a DRX retransmission timer that is expected to be started by the second terminal according to the initial-transmission resource that is selected and/or the DRX configuration parameters; and subsequently, selecting the retransmission resources among the candidate transmission resources according to an active time of the second terminal, wherein the active time comprises at least the active time of the DRX retransmission timer that is expected to be started by the second terminal.

The implementation (2): determining an active time of a DRX retransmission timer that is expected to be started by the second terminal according to the retransmission resources that are selected and/or the DRX configuration parameters; and subsequently, selecting the retransmission resources among the candidate transmission resources according to an active time of the second terminal, wherein the active time comprises at least the active time of the DRX retransmission timer that is expected to be started by the second terminal.

In other words, in the selection of the N−1 retransmission resources for the to-be-transmitted data, the resource selection may be based on the initial-transmission resource that is selected, and the selection may also be based on the retransmission resources that are selected. For example, in the selection of the first retransmission resource, the selection may be based on the initial-transmission resource, and certainly the selection of the second and subsequent retransmission resources also may be based on the initial-transmission resource. As another example, when a retransmission resource is selected, the selection of the subsequent retransmission resources may be based on that retransmission resource.

A particular implementing process of the implementation (1) will be described below:

The first step: determining an active time of a DRX retransmission timer that is expected to be started by the second terminal according to the initial-transmission resource that is selected and/or the DRX configuration parameters.

For example, the active time of the DRX retransmission timer that is expected to be started by the second terminal refers to the active time of the DRX retransmission timer of the second terminal that is related to the initial-transmission resource.

This step may particularly comprise: according to the slot where the initial-transmission resource that is selected is located, a Physical Sidelink Feedback Channel (PSFCH) period among the resource-pool configuration parameters, and the minimum delay of the HARQ feedback, acquiring the slot when the second terminal performs the HARQ feedback; and, further, according to the DRX configuration parameters, acquiring the values of the drx-HARQ-RTT-TimerSL and the drx-RetransmissionTimerSL of the second terminal, to determine the active time of the DRX retransmission timer of the second terminal that is related to the initial-transmission resource.

The second step: selecting the retransmission resources among the candidate transmission resources according to an active time of the second terminal, wherein the active time comprises at least the active time related to the initial-transmission resource.

In this step, by, according to the active time of the second terminal, selecting the retransmission resources among the candidate transmission resources, the selected retransmission resources can be located within the active time of the second terminal, so that the second terminal can receive the data sent by the first terminal, thereby reducing data losing in the process of data transmission, which, while saving the energy consumption of the terminal, improving the reliability of the data transmission.

A particular implementing process of the implementation (2) will be described below:

The first step: determining an active time of a DRX retransmission timer that is expected to be started by the second terminal according to the retransmission resources that are selected and/or the DRX configuration parameters.

For example, the active time of the DRX retransmission timer that is expected to be started by the second terminal refers to the active time of the DRX retransmission timer of the second terminal that is related to the retransmission resources that are selected.

This step may particularly comprise: according to the slot where the retransmission resources that are selected are located, a Physical Sidelink Feedback Channel (PSFCH) period among the resource-pool configuration parameters, and the minimum delay of the HARQ feedback, acquiring the slot when the second terminal performs the HARQ feedback; and, further, according to the DRX configuration parameters, acquiring the values of the drx-HARQ-RTT-TimerSL and the drx-RetransmissionTimerSL of the second terminal, to determine the active time of the DRX retransmission timer of the second terminal that is related to the i-th transmission resource.

The second step: according to an active time of the second terminal, selecting the retransmission resources subsequent to the retransmission resources that are selected among the candidate transmission resources, wherein the active time comprises at least the active time related to the retransmission resources that are selected.

In this step, by, according to the active time of the second terminal, selecting the retransmission resources among the candidate transmission resources, the selected retransmission resources can be located within the active time of the second terminal, so that the second terminal can receive the data sent by the first terminal, thereby reducing data losing in the process of data transmission, which, while saving the energy consumption of the terminal, improving the reliability of the data transmission.

The resource selection process common to the implementation (1) and the implementation (2) will be described below:

The first step: according to the DRX active time (for example, the first on-duration time duration) of the second terminal after a time instant n, selecting the initial-transmission resource among the candidate transmission resources, wherein n is an arrival time of the to-be-transmitted data, or n is a triggering time of resource selection or re-selection, wherein the triggering time of the resource selection or re-selection refers to the moment when the resource selection or re-selection is triggered for the to-be-transmitted data.

In other words, the candidate transmission resources should overlap with the DRX active time (for example, the first on-duration time duration) of the second terminal after the time instant n.

The second step: according to the i-th transmission resource that is selected and/or the DRX configuration parameters, determining an active time of a DRX retransmission timer that is expected to be started by the second terminal.

For example, the active time of the DRX retransmission timer that is expected to be started by the second terminal refers to the active time of the DRX retransmission timer of the second terminal that is related to the i-th transmission resource.

This step may particularly comprise: according to the slot where the i-th transmission resource that is selected is located, a Physical Sidelink Feedback Channel (PSFCH) period among the resource-pool configuration parameters, and the minimum delay of the HARQ feedback, acquiring the slot when the second terminal performs the HARQ feedback; and, further, according to the DRX configuration parameters, acquiring the values of the drx-HARQ-RTT-TimerSL and the drx-RetransmissionTimerSL of the second terminal, to determine the active time of the DRX retransmission timer of the second terminal that is related to the i-th transmission resource.

The third step: according to an active time of the second terminal, selecting the (i+1)-th transmission resource among the candidate transmission resources, wherein the active time comprises at least the active time related to the i-th transmission resource, i is a positive integer smaller than N, and the (i+1)-th transmission resource is the retransmission resource.

In this step, by, according to the active time of the second terminal, selecting the (i+1)-th transmission resource among the candidate transmission resources, the selected (i+1)-th transmission resource can be located within the active time of the second terminal, so that the second terminal can receive the data sent by the first terminal, thereby reducing data losing in the process of data transmission, which, while saving the energy consumption of the terminal, improving the reliability of the data transmission.

It should be noted that the present example illustrates by taking the case as an example in which the (i+1)-th transmission resource is selected according to the i-th transmission resource that is selected, and, certainly, the (i+2)-th, the (i+3)-th, and so on, transmission resources also may be selected based on the i-th transmission resource.

In a second mode, the step of selecting the N transmission resources for the to-be-transmitted data among the candidate transmission resources particularly comprises:

The first step: selecting N transmission resources among the candidate transmission resources.

Here, it should be noted that the N transmission resources selected in this step are required to satisfy the limitation on the minimum time interval between any two selected resources prescribed by relevant technical mechanisms.

The second step: according to the N transmission resources and/or the DRX configuration parameters, determining an active time of a DRX retransmission timer that is expected to be started by the second terminal.

For example, in this step, the active time of the DRX retransmission timer that is expected to be started by the second terminal is at least N−1 active times of the DRX retransmission timer of the second terminal.

This step particularly comprises: according to the slot where the N transmission resources are located, the PSFCH period among the resource-pool configuration parameters, and the minimum delay of the HARQ feedback, acquiring the N−1 slots when the second terminal performs the HARQ feedback; and subsequently, according to the DRX configuration parameters, acquiring the values of the drx-HARQ-RTT-TimerSL and the drx-RetransmissionTimerSL of the second terminal, to, according to the above-described multiple acquired parameters, determine the at least N−1 active times of the drx-RetransmissionTimerSL of the second terminal.

Here, it should be noted that, firstly, the at least N−1 active times of the DRX retransmission timer of the second terminal that are acquired in this step should be active times related to the to-be-transmitted data. Secondly, the quantity of the active times that are acquired in this step may be decided according to particular implementations; for example, the quantity of the active times may also be N.

The third step: if at least M transmission resources among the N transmission resources are located within the active time of the second terminal, determining the N transmission resources to be the transmission resources for transmitting the to-be-transmitted data, wherein the active time comprises at least the N−1 active times.

The fourth step: if at least M transmission resources among the N transmission resources are not located within the active time, re-selecting N transmission resources among the candidate transmission resources.

In other words, the third step and the fourth step comprise: determining the N transmission resources selected in the first step, to determine whether at least some transmission resources of the selected N transmission resources should be located within the active time of the second terminal; if at least M transmission resources are located within the active time, then determining the currently selected N transmission resources to be the transmission resources for transmitting the to-be-transmitted data; and if smaller than M transmission resources are located within the active time, then re-selecting N transmission resources.

M is a positive integer smaller than or equal to N.

Here, it should be noted that M may depend on the particular implementation of the first terminal or depend on the resource-pool configuration of the first terminal, and, certainly, M should be greater than or equal to 1.

As an alternative implementation, the candidate transmission resources include:

Y candidate slots, wherein at least some of the Y candidate slots are located within a DRX active time of the second terminal after a time instant n, and Y is greater than or equal to a minimum number of candidate slots that are configured by a network or pre-configured; or N candidate-transmission-resource groups, wherein a first candidate-transmission-resource group is located within a DRX active time of the second terminal after a time instant n;

wherein N refers to the number of transmissions, and n is an arrival time of the to-be-transmitted data, or n is a triggering time of resource selection or re-selection, wherein the triggering time of the resource selection or re-selection refers to the moment when the resource selection or re-selection is triggered for the to-be-transmitted data.

In other words, in the embodiments of the present disclosure, the candidate transmission resources may have two forms. One form is Y candidate slots; in other words, all of the transmission resources of the N times of transmission of the to-be-transmitted data are located within the Y candidate slots. The other is N candidate-transmission-resource groups; in other words, the transmission resource of each time of transmission of the to-be-transmitted data is located in one candidate-transmission-resource group.

Here, it should be noted that the minimum number of candidate slots may also be configured by using a high-level signaling. Furthermore, as shown in FIG. 4, if the candidate transmission resources are Y consecutive slots, the starting position of the Y slots is located subsequent to the starting time of the on-duration time duration or coincides with the starting time of the on-duration time duration, and the ending position of the Y slots is located preceding the ending time of the resource selection window or coincides with the ending time of the resource selection window. In other words, the Y candidate slots are required to overlap with the DRX active time of the second terminal after the time instant n.

In the present alternative implementation, by configuring the first candidate-transmission-resource group to be located within the DRX active time (for example, the first on-duration time duration) of the second terminal after the time instant n, or configuring at least some slots of the Y candidate slots to be located within the DRX active time (for example, the first on-duration time duration) of the second terminal after the time instant n, the initial-transmission resource for transmitting the to-be-transmitted data is located within the DRX active time (for example, the first on-duration time duration) of the second terminal after the time instant n, which can enable the second terminal to receive the data carried by the initial-transmission resource, thereby improving the reliability of the data transmission.

As an alternative implementation, if the candidate transmission resources include the Y candidate slots, the step 301 of, according to the number of transmissions of the to-be-transmitted data, the Discontinuous Reception DRX configuration parameters of the second terminal and the resource-pool configuration parameters of the second terminal, selecting the candidate transmission resources for the to-be-transmitted data in the resource selection window comprises:

determining a time-domain starting position of the candidate transmission resources as n+T1+X, wherein n+T1+X is located within the DRX active time of the second terminal after the time instant n, n+T1 is a starting time of the resource selection window, and X is a first slot interval.

In other words, in the present alternative implementation, as shown in FIG. 4, X is the time-domain interval between the starting of the first slot among the Y candidate slots and the moment of the starting time (n+T1) of the resource selection window.

Here, it should be noted that the Y candidate slots should satisfy the following conditions:

$$T_{DRX\_on\_start} \leq n+T1+X \leq T_{DRX\_on\_end} \text{ and } n+T1+X+Y \leq n+T2;$$

wherein $T_{DRX\_on\_start}$ refers to the starting time of the first on-duration of the second terminal after the time instant n, and $T_{DRX\_on\_end}$ refers to the ending time of the first on-duration of the second terminal after the time instant n. In other words, the Y candidate slots are required to overlap with the DRX active time (for example, the first on-duration time duration) of the second terminal after the time instant n, and the ending position of the Y candidate slots is located preceding the ending time of the resource selection window or coincides with the ending time of the resource selection window.

As an alternative implementation, if the candidate transmission resources include the N candidate-transmission-resource groups, the step 301 of, according to the number of transmissions of the to-be-transmitted data, the Discontinuous Reception DRX configuration parameters of the second terminal and the resource-pool configuration parameters of the second terminal, selecting the candidate transmission resources for the to-be-transmitted data in the resource selection window comprises:

The first step: determining a time-domain starting position of the first candidate-transmission-resource group as n+T1+X, wherein the first candidate-transmission-resource group is located within the DRX active time (for example, the first on-duration time duration) of the second terminal after the time instant n, n+T1 is the starting time of the resource selection window, and X is a first slot interval.

In other words, X is the time-domain interval between the starting of the first slot in the first candidate-transmission-resource group and the moment of the starting time (n+T1) of the resource selection window.

Here, it should be noted that the first candidate-transmission-resource group should satisfy the following conditions:

$$n+T1+X \geq T_{DRX\_on\_start} \text{ and } n+T1+X+Y_1 \leq T_{DRX\_on\_end};$$

wherein $T_{DRX\_on\_start}$ refers to the starting time of the first on-duration of the second terminal after the time instant n, and $T_{DRX\_on\_end}$ refers to the ending time of the first on-duration of the second terminal after the time instant n; and $Y_1$ refers to the quantity of the slots included by the first candidate-transmission-resource group, and is greater than or equal to P, wherein P refers to the minimum number of candidate slots in the resource selection window for each of the initially transmitted or retransmitted data packets for the current service that is high-level configured or pre-configured. In other words, the first candidate-transmission-resource group is required to be located within the first on-duration time duration of the second terminal after the time instant n.

The second step: according to the DRX configuration parameters and the resource-pool configuration parameters, determining the other N−1 candidate-transmission-resource groups than the first candidate-transmission-resource group.

Here, it should be noted that the last slot of each of the candidate-transmission-resource groups and the first slot of its next neighboring candidate-transmission-resource group should have a slot interval therebetween, and their intervals may sequentially be $\{L_1, L_2, \ldots, L_{N-1}\}$, wherein the intervals may be decided according to particular implementations of the first terminal.

The third step: if it is determined that the last slot of an N-th candidate-transmission-resource group exceeds an ending time of the resource selection window, adjusting at least one of the following parameters:

a quantity of slots within the candidate-transmission-resource groups;

slot intervals between two neighboring instances of the candidate-transmission-resource groups; and a starting position of the first candidate-transmission-resource group.

In other words, after the initial-transmission resource and the N−1 retransmission resources are selected, it is required to further determine whether the last slot of the last candidate transmission resource is located in the resource selection window. If no, then it is required to adjust at least one of the quantities of the slots in the candidate-transmission-resource groups, the slot intervals between two neighboring candidate-transmission-resource groups, and the starting position of the first candidate-transmission-resource group, and re-select the initial-transmission resource and the N−1 retransmission resources, whereby the last candidate-transmission-resource group is located in the resource selection window, thereby realizing the selection of the transmission resource.

The implementing process of the present alternative implementation will be described below:

A) configuring that each of the candidate-transmission-resource groups comprises Y/N slots (slots). Y refers to the minimum total quantity of the candidate slots configured by the high-level signaling minNumCandidateSlots;

or, configuring that the resource quantities of the candidate-transmission-resource groups are sequentially $\{Y_1, Y_2, \ldots, Y_N\}$ and, for any $Y_i \in \{Y_1, Y_2, Y_N\}$, $Y_i \geq P$ is satisfied, wherein P refers to the minimum quantity of the candidate slots of each of the to-be-transmitted data configured by the high-level signaling minCandidateSlotsPerPacket.

B) configuring the time-domain starting position of the candidate transmission resources as n+T1+X. X refers to the time-domain interval between the starting of the first slot of $Y_1$ and n+T1, and satisfies $n+T1+X \geq T_{DRX\_on\_start}$ and $n+T1+X+Y_1 \leq T_{DRX\_on\_end}$, wherein $T_{DRX\_on\_start}$ refers to the starting time of the first on-duration time duration of the second terminal after the time instant n, and $T_{DRX\_on\_end}$ refers to the ending time of the first on-duration of the second terminal after the time instant n. In other words, $Y_1$ is required to correspond to the first on-duration of the second terminal after the time instant n.

C) pre-estimating the position of the initial-transmission resource within $Y_1$ (for example, the intermediate slot located within $Y_1$).

D) according to the DRX configuration parameters and the resource-pool configuration parameters of the second terminal, calculating the slot of the transmission NACK corresponding to the initial-transmission resource, and the next drx-RetransmissionTimerSL active time.

Figure 5:
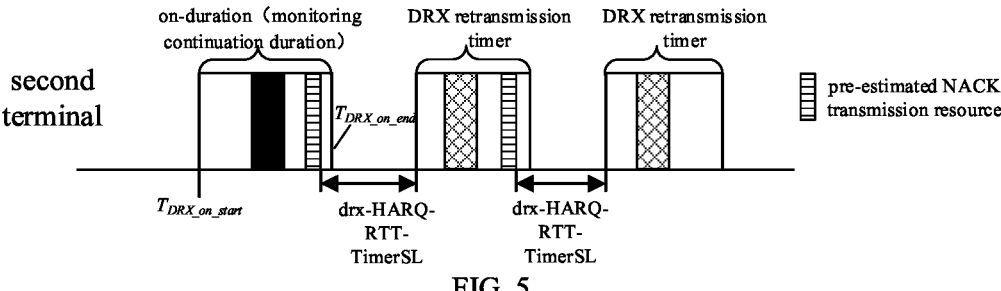
FIG. 5 is a second schematic diagram of the selection of the candidate transmission resources according to an embodiment of the present disclosure.

E) As shown in FIG. 5, pre-estimating the slot where the retransmission resource is located within the drx-RetransmissionTimerSL active time (for example, the intermediate slot of the time duration), and correspondingly configuring the position of $Y_2$ in the resource selection window (for example, to cause the pre-estimated retransmission resource to be located within the intermediate slot of $Y_2$), wherein the interval between the last slot of $Y_1$ and the first slot of $Y_2$ is L1.

F) configuring the E-th candidate-transmission-resource group according to D) and E), till the configuring of all of the N candidate-transmission-resource groups is completed. Recording that the intervals between the last slot of each of the candidate-transmission-resource groups and the first slot of the next candidate-transmission-resource group are sequentially $\{L_1, L_2, \ldots, L_N\}$.

G) determining whether, after the above-described configuring, the last slot of the last candidate-transmission-resource group exceeds the ending time of the resource selection window; if yes, then, by the first terminal, on the basis that X and P are satisfied, reducing at least one of the quantities of the slots in the candidate-transmission-resource groups, the intervals between two neighboring candidate-transmission-resource groups, and the starting position of the candidate transmission resources, and repeating executing that step; and if no, then finishing the selection of the candidate transmission resources.

As an alternative implementation, if the candidate transmission resources include Y candidate slots, the step 302 of, selecting the transmission resource for the to-be-transmitted data among the candidate transmission resources according to the DRX configuration parameters comprises:

The first step: selecting one initial-transmission resource among the candidate transmission resources, wherein the initial-transmission resource is located within a DRX active time (for example, the first on-duration) of the second terminal after the time instant n.

This step may particularly comprise: firstly, randomly selecting one initial-transmission resource for the to-be-transmitted initially transmitted data among the candidate transmission resources; secondly, according to the DRX configuration parameters, determining the DRX active time (for example, the first on-duration) after the time instant n; and thirdly, determining whether the currently selected initial-transmission resource is located within the DRX active time (for example, the first on-duration) of the second terminal after the time instant n, and if no, then re-selecting the initial-transmission resource. The two processes of "firstly" and "secondly" do not have a strict time-sequence relation therebetween, wherein they may be executed concurrently, or the process of "secondly" may be executed firstly, and subsequently the process of "firstly" is executed.

The second step: selecting N−1 retransmission resources among the candidate transmission resources, wherein the retransmission resources are located within an active time of the second terminal, and the active time is a time duration that is decided according to the DRX configuration parameters.

Here, it should be noted that the second step should be a step that is executed after the first step is completed. In other words, after it is determined that the selected initial-transmission resource is located within the DRX active time (for example, the first on-duration) of the second terminal after the time instant n, this step is subsequently executed.

In the selection of the retransmission resources, it is required to, according to the DRX configuration parameters and the resource-pool configuration parameters, and the initial-transmission resource (when a retransmission resource is selected this time) or the retransmission resource (when the second and subsequent retransmission resources are selected this time) that is selected in the preceding time, acquire the active time of the next DRX retransmission timer of the second terminal, wherein the active time of the next DRX retransmission timer refers to the active time of the DRX retransmission timer that is related to the initial-transmission resource or retransmission resource that is selected in the preceding time, thereby, if the limitation on the interval between two neighboring transmission resources of the first terminal (for example, the HARQ RTT limitation) is satisfied, randomly selecting the retransmission resource among the candidate transmission resources, and further determining whether the selected retransmission resource is located within the active time of the second terminal; and if no, then re-selecting that retransmission resource.

In the present alternative implementation, each time one transmission resource is selected, it is determined whether that transmission resource is located within the active time of the second terminal, which ensures that, when each of the currently selected initial-transmission resource and the N−1 retransmission resources is used for the data transmission, the second terminal can receive the transmitted data, to reduce data losing, thereby improving the reliability of the data transmission.

Here, it should be noted that, in the present alternative implementation, the Y candidate slots may be selected according to the above-described alternative implementations, and the Y candidate slots are required to satisfy the restrictive conditions according to the above-described alternative implementations.

The implementing process of the present alternative implementation will be described below with reference to FIG. 6:

Step 1: by the first terminal, randomly selecting the initial-transmission resource for the to-be-transmitted data within the Y candidate slots, determining whether the selected initial-transmission resource is located within the DRX active time (for example, the first on-duration) of the second terminal after the time instant n, and if no, then re-selecting the initial-transmission resource.

Step 2: according to the PSFCH period among the resource-pool configuration parameters and the minimum delay of the HARQ feedback (for example, the feedback delay shown in FIG. 6) of the second terminal, acquiring the slot when the second terminal performs the HARQ feedback; and according to the DRX configuration parameters of the second terminal, acquiring the values of the drx-HARQ-RTT-TimerSL and the drx-RetransmissionTimerSL of the second terminal, and determining the next active time of the drx-RetransmissionTimerSL.

Figures 6, 7:
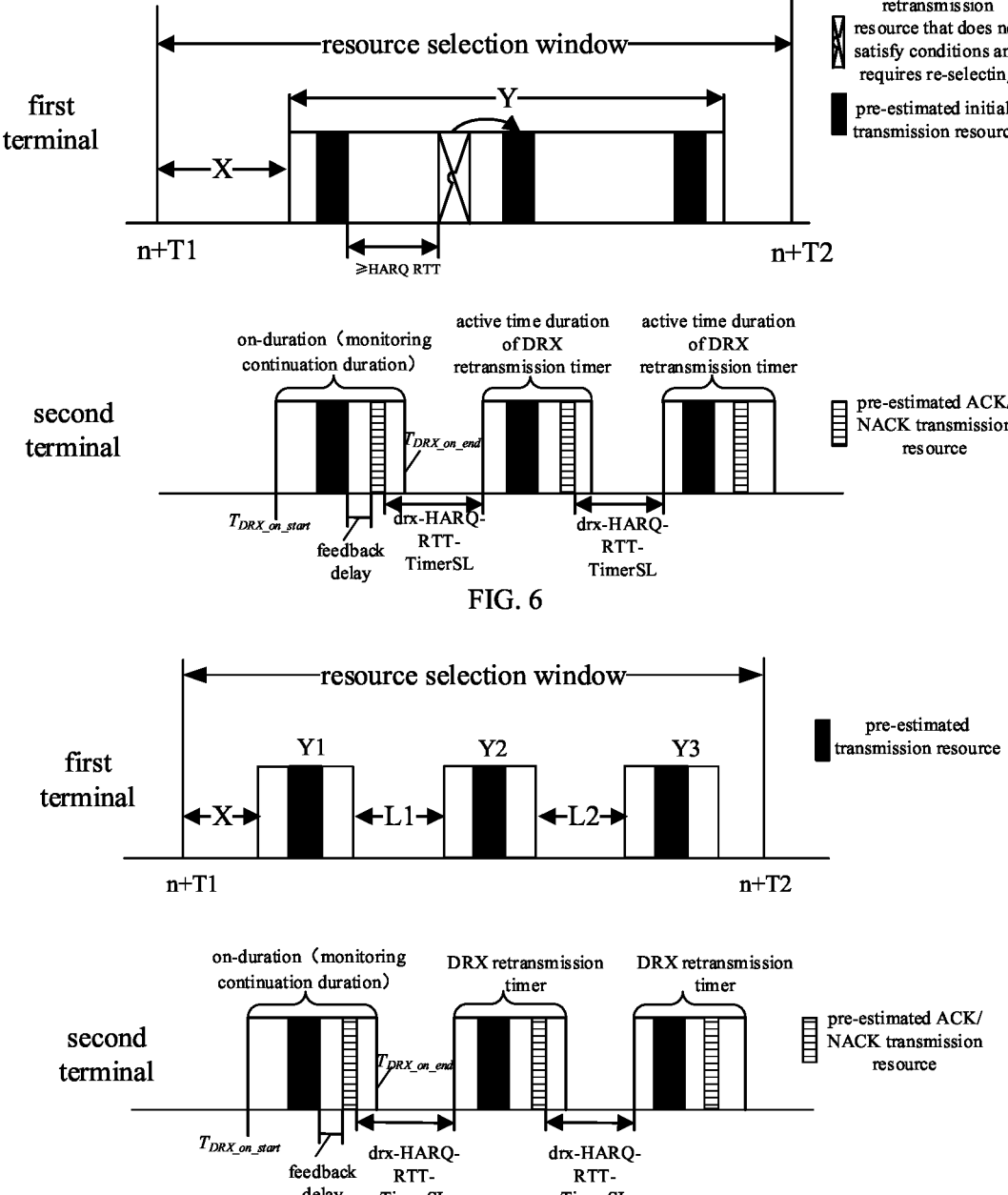
FIG. 6 is a first schematic diagram of the selection of the transmission resource according to an embodiment of the present disclosure.
FIG. 7 is a second schematic diagram of the selection of the transmission resource according to an embodiment of the present disclosure.

Step 3: if the HARQ RTT limitation of the first terminal is satisfied, randomly selecting the retransmission resource, determining whether the selected retransmission resource is located within the active time of the second terminal, and if no (as shown in FIG. 6), then re-selecting the retransmission resource.

Step 4: according to Step 2 and Step 3, selecting the i-th retransmission resource, till the selection of all of the N−1 retransmission resources is completed.

As an alternative implementation, if the candidate transmission resources include N candidate-transmission-resource groups, the step 302 of, selecting the transmission resource for the to-be-transmitted data among the candidate transmission resources according to the DRX configuration parameters comprises:

The first step: selecting one initial-transmission resource from a first candidate-transmission-resource group.

Here, it should be noted that the first candidate-transmission-resource group is located within the DRX active time (for example, the first on-duration) of the second terminal after the time instant n. Therefore, this step may comprise randomly selecting one initial-transmission resource in the first candidate-transmission-resource group, wherein the initial-transmission resource is located within the active time of the second terminal.

The second step: selecting N−1 retransmission resources from N−1 candidate-transmission-resource groups other than the first candidate-transmission-resource group, wherein the retransmission resources are located within an active time of the second terminal, and the active time is a time duration that is decided according to the DRX configuration parameters.

In other words, this step particularly comprises selecting one retransmission resource from each of the candidate-transmission-resource groups other than the first candidate-transmission-resource group. The more particular selecting process in this step may comprise: firstly, according to the PSFCH period among the resource-pool configuration parameters and the minimum delay of the HARQ feedback, acquiring the slot when the second terminal performs the HARQ feedback; according to the DRX configuration parameters, acquiring the values of the drx-HARQ-RTT-TimerSL and the drx-RetransmissionTimerSL of the second terminal, and determining the next active time of the drx-RetransmissionTimerSL; and secondly, selecting the retransmission resource in the candidate-transmission-resource group, determining whether the retransmission resource is located within the active time of the second terminal, if no, then re-selecting the retransmission resource in that candidate-transmission-resource group, and if yes, then selecting the next retransmission resource in the next candidate-transmission-resource group.

Here, it should be noted that, in the present alternative implementation, the N candidate-transmission-resource groups may be selected according to the above-described implementations, and the N candidate-transmission-resource groups are required to satisfy the restrictive conditions according to the above-described alternative implementations.

The implementing process of the present alternative implementation will be described below with reference to FIG. 7:

Step 1: by the first terminal, randomly selecting the initial-transmission resource for the to-be-transmitted data within $Y_1$.

Step 2: according to the PSFCH period among the resource-pool configuration parameters and the minimum delay of the HARQ feedback (the feedback delay in FIG. 7) of the second terminal, acquiring the slot when the receiving UE performs the HARQ feedback; and according to the DRX configuration parameters of the second terminal, acquiring the values of the drx-HARQ-RTT-TimerSL and the drx-RetransmissionTimerSL of the second terminal, and determining the next active time of the drx-RetransmissionTimerSL.

Step 3: if the HARQ RTT limitation of the first terminal is satisfied, randomly selecting the retransmission resource in $Y_2$, determining whether the selected resource is located within the active time of the second terminal (i.e., the active time of the drx-onDurationTimer or the drx-RetransmissionTimerSL), if yes, then finishing the selection of that retransmission resource, and if no, then re-selecting the retransmission resource in $Y_2$.

Step 4: according to Step 2 and Step 3, selecting the i-th retransmission resource in the E-th candidate-transmission-resource group, till the selection of all of the N retransmission resources is completed.

As an alternative implementation, if the candidate transmission resources include Y candidate slots, the step of, selecting the transmission resource for the to-be-transmitted data among the candidate transmission resources according to the DRX configuration parameters comprises: The first step: selecting N transmission resources from the Y candidate slots.

Here, it should be noted that the selected N transmission resources are required to satisfy the limitation on the mini-mum time interval between any two selected resources prescribed by relevant technical mechanisms.

The second step: if at least M transmission resources among the N transmission resources are located within an active time of the second terminal, determining the N transmission resources to be the transmission resources for transmitting the to-be-transmitted data, wherein the active time is a time duration that is decided according to the DRX configuration parameters and/or the N transmission resources.

The third step: if at least M transmission resources among the N transmission resources are not located within the active time, re-selecting N transmission resources from the Y candidate slots.

In other words, the second step and the third step comprise determining the N transmission resources selected in the first step, to determine whether at least some transmission resources of the selected N transmission resources should be located within the active time of the second terminal. Particularly, this step may comprise: firstly, according to the slot where the selected N transmission resources are located and/or the DRX configuration parameters of the second terminal, determining all of the active times of the second terminal; and secondly, determining the quantity of the selected N transmission resources that are located within the active times of the second terminal, and if at least M transmission resources are located within the active times, then determining the currently selected N transmission resources to be the transmission resources for transmitting the to-be-transmitted data; and if smaller than M transmission resources are located within the active times, then re-selecting N transmission resources.

M is a positive integer smaller than or equal to N.

Here, it should be noted that M may depend on the particular implementation of the first terminal or depend on the resource-pool configuration of the first terminal, and, certainly, M should be greater than or equal to 1.

Here, it should be noted that, in the present alternative implementation, the Y candidate slots may be selected according to the above-described alternative implementations, and the Y candidate slots are required to satisfy the restrictive conditions according to the above-described alternative implementations.

The implementing process of the present alternative implementation will be described below:

Step 1: by the first terminal, randomly selecting initial-transmission and retransmission resources for N times of transmission of the to-be-transmitted data within Y consecutive slots, wherein the initial-transmission and retransmission resources are required to satisfy the limitation on the minimum time interval between any two selected resources prescribed by relevant technical mechanisms.

Step 2: according to the slot where the selected initial-transmission and retransmission resources are located and the resource-pool configuration and the DRX configuration of the receiving UE, determining the active times of all of the drx-RetransmissionTimerSLs of the receiving UE.

Step 3: determining whether all of the selected transmitting resources are located within the active time of the second terminal, or at least M transmission resources are located within the active time of the second terminal, and if no, then repeating executing the Step 1 and the Step 2, till the selected transmission resources satisfy the determination conditions of Step 3. M depends on the implementation of the first terminal or the resource-pool configuration, and $M \geq 1$.

As an alternative implementation, if the candidate transmission resources include N candidate-transmission-resource groups, the step of, selecting the transmission resource for the to-be-transmitted data among the candidate transmission resources according to the DRX configuration parameters comprises:

The first step: selecting one transmission resource from each of candidate-transmission-resource groups.

Likewise, the N transmission resources selected in this step are required to satisfy the limitation on the minimum time interval between any two selected resources prescribed by relevant technical mechanisms.

The second step: if at least M transmission resources among N transmission resources are located within an active time of the second terminal, determining the N transmission resources to be the transmission resources for transmitting the to-be-transmitted data, wherein the active time is a time duration that is decided according to the DRX configuration parameters and/or the N transmission resources.

The third step: if at least M transmission resources among the N transmission resources are not located within the active time, re-selecting one transmission resource from each of the candidate-transmission-resource groups.

In other words, the second step and the third step comprise determining the N transmission resources selected in the first step, to determine whether at least M transmission resources of the selected N transmission resources are located within the active time of the second terminal. Particularly, this step may comprise: firstly, according to the slot where the selected N transmission resources are located and/or the DRX configuration parameters of the second terminal, determining all of the active times of the second terminal; and secondly, determining the quantity of the selected N transmission resources that are located within the active times of the second terminal, and if at least M transmission resources are located within the active times, then determining the currently selected N transmission resources to be the transmission resources for transmitting the to-be-transmitted data; and if smaller than M transmission resources are located within the active times, then re-selecting N transmission resources.

M is a positive integer smaller than or equal to N.

Here, it should be noted that M may depend on the particular implementation of the first terminal or depend on the resource-pool configuration of the first terminal, and, certainly, M should be greater than or equal to 1.

Here, it should also be noted that, in the present alternative implementation, the N candidate-transmission-resource groups may be selected according to the above-described implementations, and the N candidate-transmission-resource groups are required to satisfy the restrictive conditions according to the above-described alternative implementations.

The implementing process of the present alternative implementation will be described below:

Step 1: by the first terminal, randomly selecting initial-transmission and retransmission resources for N times of transmission of the to-be-transmitted data in the N candidate-transmission-resource groups individually, wherein the initial-transmission and retransmission resources are required to satisfy the limitation on the minimum time interval between any two selected resources prescribed by relevant technical mechanisms. In other words, the first terminal selects one transmission resource from each of the candidate-transmission-resource groups.

Step 2: according to the slot where the selected initial-transmission and retransmission resources are located and the resource-pool configuration and the DRX configuration of the second terminal, determining the active times of all of the drx-RetransmissionTimerSLs of the second terminal.

Step 3: determining whether all of the selected transmission resources are located within the active time of the second terminal, or at least M transmission resources are located within the active time of the second terminal, and if no, then repeating executing the Step 1 and the Step 2, till the selected resources satisfy the determination conditions of the Step 3. M depends on the implementation of the UE or the resource-pool configuration, and M≥1.

Here, it should be noted that, after the step of, by the first terminal, selecting the transmission resource for the to-be-transmitted data, the method further comprises:

Transmitting the to-be-transmitted data on the selected transmission resource.

Particularly, the method comprises: transmitting the to-be-transmitted data (the initially transmitted data packet) on the first transmission resource (the initial-transmission resource);

after the NACK feedback sent by the second terminal is received, transmitting the to-be-transmitted data (a retransmitted data packet) on the second transmission resource (the first retransmission resource); and if the ACK feedback sent by the second terminal is received or, within a preset time period. The NACK feedback or the ACK feedback sent by the second terminal is not received, stopping transmitting the to-be-transmitted data; or, after the to-be-transmitted data is transmitted on the N-th transmission resource, stopping transmitting the to-be-transmitted data.

Figures 8, 9:
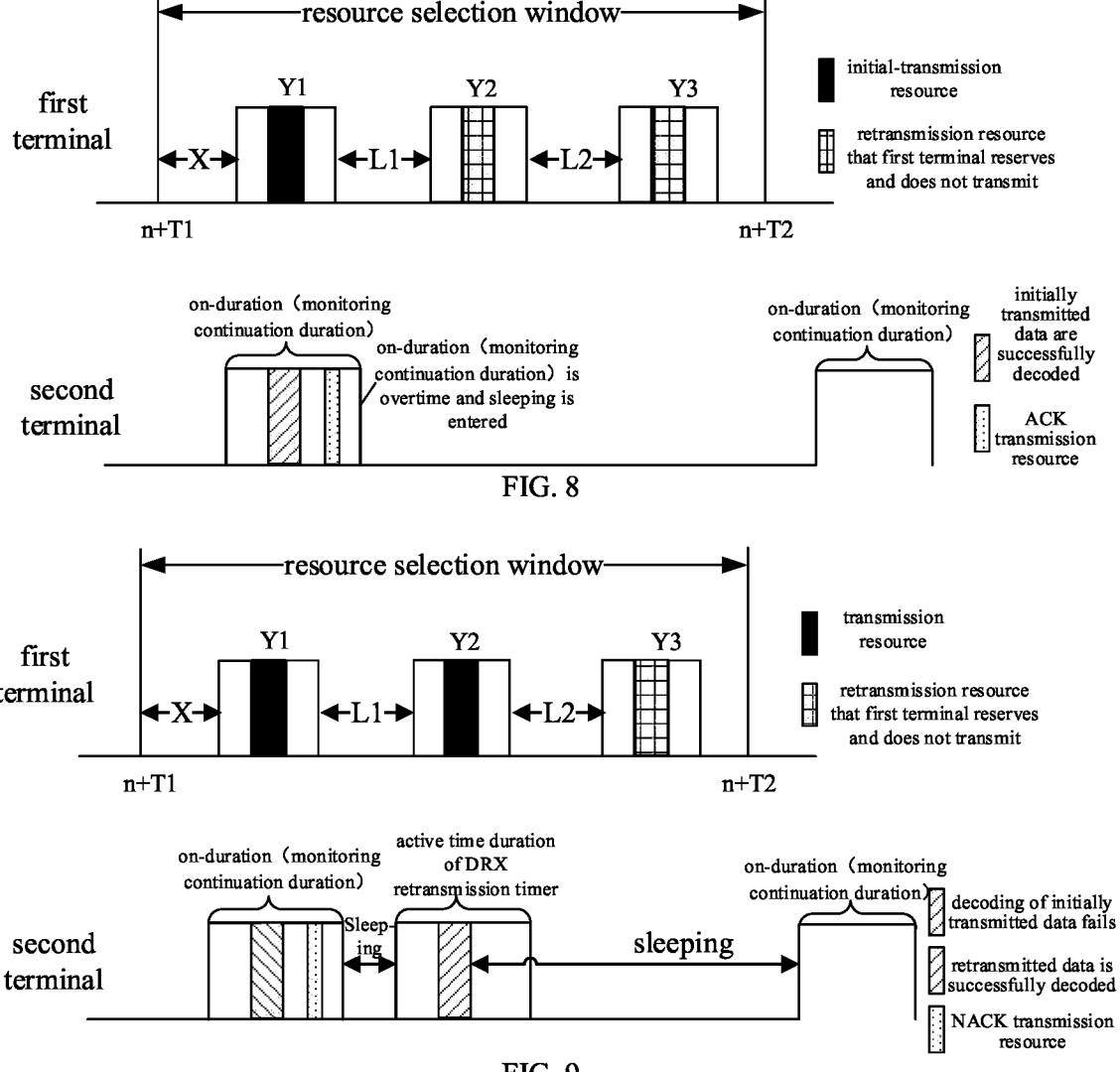
FIG. 8 is a first schematic diagram of the DRX performed by the second terminal according to an embodiment of the present disclosure.
FIG. 9 is a second schematic diagram of the DRX performed by the second terminal according to an embodiment of the present disclosure.

Here, it should also be noted that the process of the discontinuous reception of the second terminal is as follows:

The second terminal performs the monitoring on the PSCCH within the DRX active time, and after the initially transmitted data packet transmitted by the first terminal is received, the DRX process of the second terminal may have the following cases:

The Case 1:

As shown in FIG. 8, the initially transmitted data packet is successfully decoded. The second terminal is not required to continuously monitor and retransmit, and may sleep after the drx-onDurationTimer is overtime. (If the second terminal supports the retransmission based on the HARQ ACK/NACK feedback, then, after the data packet is successfully decoded, the second terminal sends ACK feedback to the first terminal).

The Case 2:

The initially transmitted data packet is not successfully decoded. The second terminal is required to continuously monitor re-transmissions, and in this case the DRX process of the second terminal, as shown in FIG. 9, comprises:

Step 1: by the second terminal, sending NACK feedback to the first terminal.

Step 2: by the second terminal, at the first symbol after the NACK transmission finishes, starting the drx-HARQ-RTT-TimerSL; if at this point the drx-onDurationTimer is not overtime, then, by the second terminal, sleeping after the drx-onDurationTimer is overtime; and if at this point the drx-onDurationTimer has already been overtime, then the second terminal immediately sleeps.

Step 3: by the second terminal, at the first symbol after the drx-HARQ-RTT-TimerSL expires, starting the drx-RetransmissionTimerSL of the current HARQ process, to perform monitoring on the retransmitted data packets.

Step 4: by the second terminal, after successfully decoding the data packet, or after receiving a transmission ending instruction of the first terminal and the drx-onDurationTimer is overtime, sleeping, till the drx-onDurationTimer is started again. (If the second terminal supports the retransmission based on the HARQ ACK/NACK feedback, then, after the data packet is successfully decoded, the second terminal sends ACK feedback to the first terminal).

The implementing process of the method for selecting a transmission resource according to the embodiments of the present disclosure will be described below with reference to FIG. 10:

S1001: by the first terminal, according to the number of transmissions N, the DRX configuration parameters of the second terminal and the resource-pool configuration parameters of the second terminal, configuring the candidate transmission resources in the resource selection window;

S1002A: by the first terminal, according to the DRX configuration parameters, selecting the initial-transmission resource and the N−1 retransmission resources for the to-be-transmitted data among the candidate transmission resources;

S1002B: by the first terminal, selecting all of the initial-transmission and retransmission resources for the to-be-transmitted data among the candidate transmission resources, wherein the initial-transmission and retransmission resources are required to be selected based on the DRX configuration parameters of the second terminal and satisfy the corresponding restrictive conditions;

S1003: by the second terminal, if the initially transmitted data packet is received but is not successfully decoded, sending NACK feedback to the first terminal, starting the drx-HARQ-RTT-TimerSL, and, after the drx-HARQ-RTT-TimerSL is overtime, starting the drx-RetransmissionTimerSL, and performing monitoring on the retransmitted data packets; and S1004: by the second terminal, after the data packet is successfully decoded, stopping the drx-RetransmissionTimerSL and sleeping, and, by the first terminal, after the ACK is received or the NACK is not received, no longer transmitting the data packets.

In the method for selecting a transmission resource according to the embodiments of the present disclosure, the first terminal, according to the number of transmissions of the to-be-transmitted data and/or the Discontinuous Reception DRX configuration parameters of the second terminal, selects the candidate transmission resources for the to-be-transmitted data in the resource selection window; and, further, according to the DRX configuration parameters, among the candidate transmission resources, selects the transmission resource for the to-be-transmitted data. Accordingly, when the first terminal is selecting the transmission resource for the to-be-transmitted data, the DRX configuration of the second terminal is sufficiently taken into consideration, so that the selected transmission resource is within the active time of the second terminal, thereby reducing packet loss in the process of data transmission, whereby the terminal can ensure the reliable transmission of the data while reducing the power consumption.

Figures 10, 11:
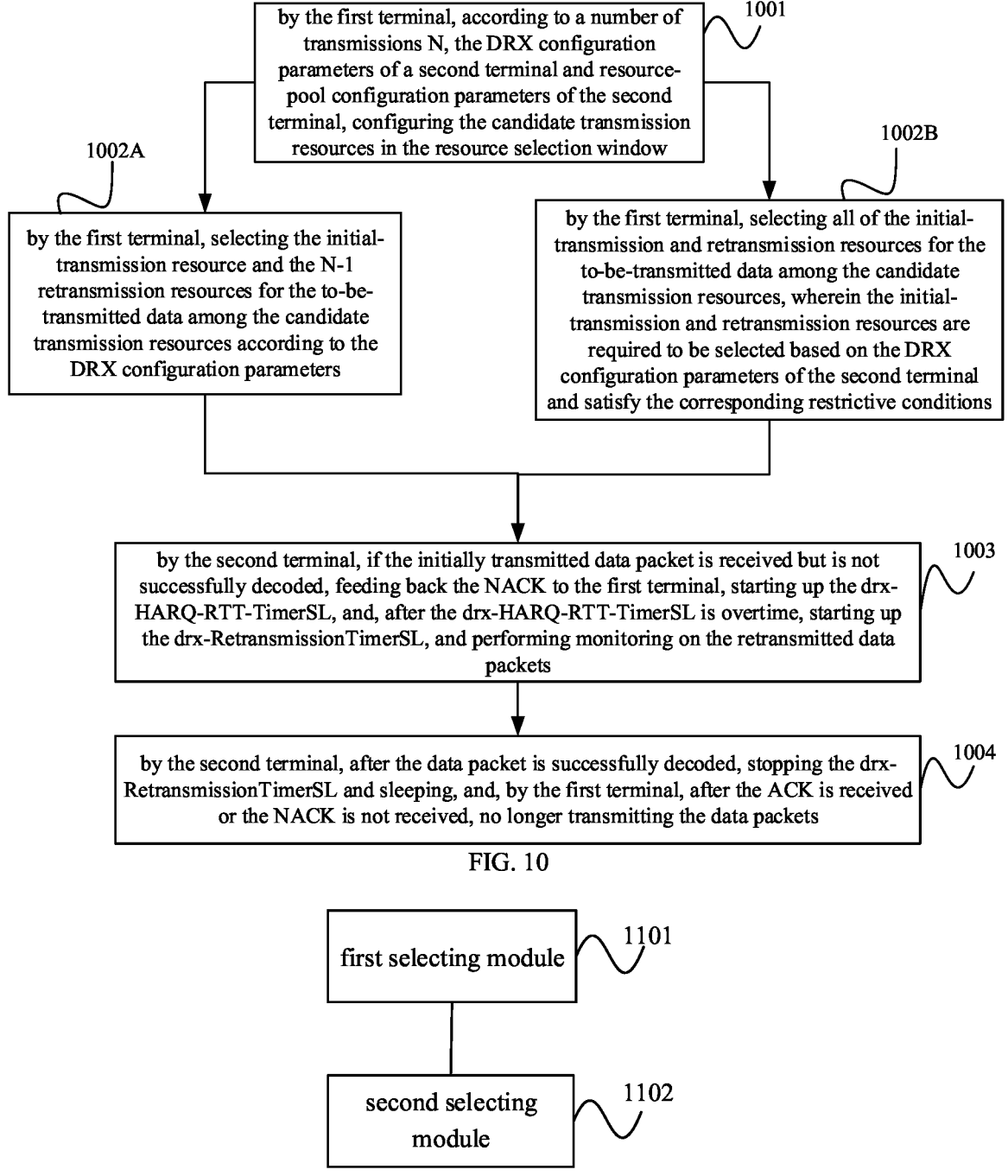
FIG. 10 is a second schematic flow chart of a method for selecting a transmission resource according to an embodiment of the present disclosure.
FIG. 11 is a schematic structural diagram of an apparatus for selecting a transmission resource according to an embodiment of the present disclosure.

As shown in FIG. 11, an embodiment of the present disclosure provides an apparatus for selecting a transmission resource, applied to a first terminal, wherein the apparatus comprises:

a first selecting module 1101 configured for, according to a number of transmissions of to-be-transmitted data, Discontinuous Reception DRX configuration parameters of a second terminal and resource-pool configuration parameters of the second terminal, selecting candidate transmission resources for the to-be-transmitted data in a resource selection window; and a second selecting module 1102 configured for, selecting the transmission resource for the to-be-transmitted data among the candidate transmission resources according to the DRX configuration parameters.

Optionally, the second selecting module 1102 comprises:

a first selecting submodule configured for, selecting an initial-transmission resource and N−1 retransmission resources for the to-be-transmitted data among the candidate transmission resources;

or a second selecting submodule configured for, selecting N transmission resources for the to-be-transmitted data among the candidate transmission resources;

wherein N refers to the number of transmissions.

Optionally, the first selecting submodule comprises:

a first selecting unit configured for, selecting the initial-transmission resource among the candidate transmission resources according to a DRX active time of the second terminal after a time instant n, wherein n is an arrival time of the to-be-transmitted data, or n is a triggering time of resource selection or re-selection.

Optionally, the first selecting submodule comprises:

a first determining unit configured for, determining an active time of a DRX retransmission timer that is expected to be started by the second terminal according to the initial-transmission resource that is selected and/or the DRX configuration parameters; and a second selecting unit configured for, selecting the retransmission resources among the candidate transmission resources according to an active time of the second terminal, wherein the active time comprises at least the active time of the DRX retransmission timer that is expected to be started by the second terminal.

Optionally, the first selecting submodule comprises:

a fourth determining unit configured for, determining an active time of a DRX retransmission timer that is expected to be started by the second terminal according to the retransmission resources that are selected and/or the DRX configuration parameters; and a fifth selecting unit configured for, selecting the retransmission resources among the candidate transmission resources according to an active time of the second terminal, wherein the active time comprises at least the active time of the DRX retransmission timer that is expected to be started by the second terminal.

Optionally, the second selecting submodule comprises:

a third selecting unit configured for selecting N transmission resources among the candidate transmission resources;

a second determining unit configured for, according to the N transmission resources and/or the DRX configuration parameters, determining an active time of a DRX retransmission timer that is expected to be started by the second terminal;

a third determining unit configured for, if at least M transmission resources among the N transmission resources are located within the active time of the second terminal, determining the N transmission resources to be the transmission resources for transmitting the to-be-transmitted data, wherein the active time comprises at least the N−1 active times; and a fourth selecting unit configured for, if at least M transmission resources among the N transmission resources are not located within the active time, re-selecting N transmission resources among the candidate transmission resources;

wherein M is a positive integer smaller than or equal to N.

Optionally, the candidate transmission resources include:

Y candidate slots, wherein at least some of the Y candidate slots are located within a DRX active time of the second terminal after a time instant n, and Y is greater than or equal to a minimum number of candidate slots that are configured by a network or pre-configured;

or

N candidate-transmission-resource groups, wherein a first candidate-transmission-resource group is located within a DRX active time of the second terminal after a time instant n;

wherein N refers to the number of transmissions, and n is an arrival time of the to-be-transmitted data, or n is a triggering time of resource selection or re-selection.

Optionally, the first selecting module 1101 comprises:

a third selecting submodule configured for, if the candidate transmission resources include the Y candidate slots, determining a time-domain starting position of the candidate transmission resources as n+T1+X, wherein n+T1+X is located within the DRX active time of the second terminal after the time instant n, n+T1 is a starting time of the resource selection window, and X is a first slot interval.

Optionally, the first selecting module 1101 comprises:

a fourth selecting submodule configured for, if the candidate transmission resources include the N candidate-transmission-resource groups, determining a time-domain starting position of the first candidate-transmission-resource group as n+T1+X, wherein the first candidate-transmission-resource group is located within the DRX active time of the second terminal after the time instant n, n+T1 is a starting time of the resource selection window, and X is a first slot interval;

a determining submodule configured for, according to the DRX configuration parameters and the resource-pool configuration parameters, determining the other N−1 candidate-transmission-resource groups than the first candidate-transmission-resource group; and an adjusting submodule configured for, if it is determined that the last slot of an N-th candidate-transmission-resource group exceeds an ending time of the resource selection window, adjusting at least one of the following parameters:

a quantity of slots within the candidate-transmission-resource groups;

slot intervals between two neighboring instances of the candidate-transmission-resource groups; and a starting position of the first candidate-transmission-resource group.

Optionally, if the candidate transmission resources include Y candidate slots, the selecting one initial-transmission resource among the candidate transmission resources, wherein the initial-transmission resource is located within a DRX active time of the second terminal after a time instant n; and selecting N−1 retransmission resources among the candidate transmission resources, wherein the retransmission resources are located within an active time of the second terminal, and the active time is a time duration that is decided according to the DRX configuration parameters.

Optionally, if the candidate transmission resources include Y candidate slots, the first selecting submodule is particularly configured for:

selecting one initial-transmission resource among the candidate transmission resources, wherein the initial-transmission resource is located within a DRX active time of the second terminal after a time instant n; and selecting N−1 retransmission resources among the candidate transmission resources, wherein the retransmission resources are located within an active time of the second terminal, and the active time is a time duration that is decided according to the DRX configuration parameters.

Optionally, if the candidate transmission resources include N candidate-transmission-resource groups, the second selecting module 1102 is particularly configured for:

selecting one initial-transmission resource from a first candidate-transmission-resource group; and selecting N−1 retransmission resources from N−1 candidate-transmission-resource groups other than the first candidate-transmission-resource group, wherein the retransmission resources are located within an active time of the second terminal, and the active time is a time duration that is decided according to the DRX configuration parameters.

Optionally, if the candidate transmission resources include N candidate-transmission-resource groups, the first selecting submodule is particularly configured for:

selecting one initial-transmission resource from a first candidate-transmission-resource group; and selecting N−1 retransmission resources from N−1 candidate-transmission-resource groups other than the first candidate-transmission-resource group, wherein the retransmission resources are located within an active time of the second terminal, and the active time is a time duration that is decided according to the DRX configuration parameters.

Optionally, if the candidate transmission resources include Y candidate slots, the selecting N transmission resources from the Y candidate slots;

if at least M transmission resources among the N transmission resources are located within an active time of the second terminal, determining the N transmission resources to be the transmission resources for transmitting the to-be-transmitted data, wherein the active time is a time duration that is decided according to the DRX configuration parameters and/or the N transmission resources; and if at least M transmission resources among the N transmission resources are not located within the active time, re-selecting N transmission resources from the Y candidate slots;

wherein M is a positive integer smaller than or equal to N.

Optionally, if the candidate transmission resources include Y candidate slots, the second selecting submodule is particularly configured for:

selecting N transmission resources from the Y candidate slots;

if at least M transmission resources among the N transmission resources are located within an active time of the second terminal, determining the N transmission resources to be the transmission resources for transmitting the to-be-transmitted data, wherein the active time is a time duration that is decided according to the DRX configuration parameters and/or the N transmission resources; and if at least M transmission resources among the N trans-
mission resources are not located within the active
time, re-selecting N transmission resources from the Y
candidate slots;

wherein M is a positive integer smaller than or equal to N.

Optionally, if the candidate transmission resources
include N candidate-transmission-resource groups, the sec-
ond selecting module 1102 is particularly configured for:

selecting one transmission resource from each of candi-
date-transmission-resource groups;

if at least M transmission resources among N transmission
resources are located within an active time of the
second terminal, determining the N transmission
resources to be the transmission resources for trans-
mitting the to-be-transmitted data, wherein the active
time is a time duration that is decided according to the
DRX configuration parameters and/or the N transmis-
sion resources; and if at least M transmission resources among the N trans-
mission resources are not located within the active
time, re-selecting one transmission resource from each
of the candidate-transmission-resource groups;

wherein M is a positive integer smaller than or equal to N.

Optionally, if the candidate transmission resources
include the N candidate-transmission-resource groups, the
second selecting submodule is particularly configured for:

if the candidate transmission resources include N candi-
date-transmission-resource groups, the step of, select-
ing the transmission resource for the to-be-transmitted
data among the candidate transmission resources
according to the DRX configuration parameters com-
prises:

selecting one transmission resource from each of candi-
date-transmission-resource groups;

if at least M transmission resources among N transmission
resources are located within an active time of the
second terminal, determining the N transmission
resources to be the transmission resources for trans-
mitting the to-be-transmitted data, wherein the active
time is a time duration that is decided according to the
DRX configuration parameters and/or the N transmis-
sion resources; and if at least M transmission resources among the N trans-
mission resources are not located within the active
time, re-selecting one transmission resource from each
of the candidate-transmission-resource groups;

wherein M is a positive integer smaller than or equal to N.

The apparatus for selecting a transmission resource
according to the embodiments of the present disclosure
corresponds to the above-described method for selecting a
transmission resource, and all of the implementation means
in the above-described method for selecting a transmission
resource are adapted for the embodiments of the apparatus
for selecting a transmission resource, to obtain the same
technical effect.

The Third Embodiment

Figure 12:
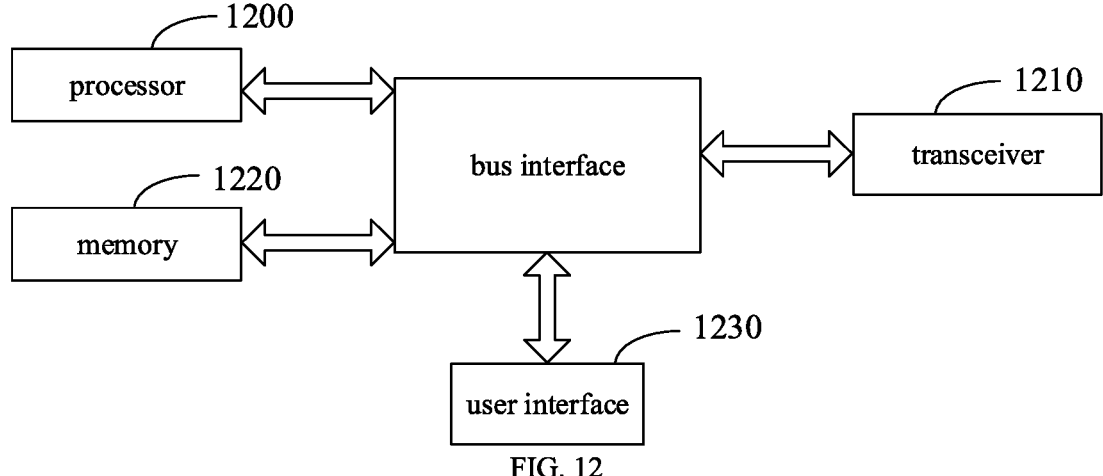
FIG. 12 is a structural block diagram of a terminal according to an embodiment of the present disclosure.

In order to realize the above-described purpose better, as
shown in FIG. 12, an embodiment of the present disclosure
further provides a terminal, wherein the terminal is particu-
larly a first terminal, and comprises: a processor 1200; and
a memory 1220 connected to the processor 1200 by a bus
interface. The memory 1220 is configured to store the
programs and the data that are used by the processor 1200 for the execution of operations. The processor 1200 invokes
and executes the programs and the data that are stored in the
memory 1220.

A transceiver 1210 is connected to the bus interface, and
is configured to receive and transmit data under the control
of the processor 1200. The processor 1200 is configured for
reading the program in the memory 1220 to execute the
following steps:

according to a number of transmissions of to-be-trans-
mitted data, Discontinuous Reception DRX configura-
tion parameters of a second terminal and resource-pool
configuration parameters of the second terminal, select-
ing candidate transmission resources for the to-be-
transmitted data in a resource selection window; and selecting the transmission resource for the to-be-transmit-
ted data among the candidate transmission resources
according to the DRX configuration parameters.

In FIG. 12, the bus architecture may comprise buses and
bridges of any quantity that are interconnected, which are
particularly linked by various electric circuits of one or more
processors represented by the processor 1200 and a memory
represented by the memory 1220. The bus architecture may
also link together various other electric circuits of, for
example, a peripheral device, a voltage regulator and a
power managing circuit, which are well known in the art and
thus are not described further herein. The bus interface
provides the interfaces. The transceiver 1210 may be a
plurality of elements, i.e., comprising an emitter and a
transceiver, and provides a unit that is configured to com-
municate with various other devices via a transmission
medium. For different terminals, the user interface 1230 may
also be an interface that can be externally or internally
connected to a required device, wherein the connected
device includes but is not limited to a keypad, a display, a
loudspeaker, a microphone, a joystick and so on. The
processor 1200 is configured to manage the bus architecture
and routine processing. The memory 1220 may store the
data that are used by the processor 1200 for the execution of
operations.

Optionally, the processor 1200, when configured for,
selecting the transmission resource for the to-be-transmitted
data among the candidate transmission resources according
to the DRX configuration parameters, is particularly con-
figured for:

selecting an initial-transmission resource and N−1
retransmission resources for the to-be-transmitted data
among the candidate transmission resources;

or selecting N transmission resources for the to-be-transmit-
ted data among the candidate transmission resources;

wherein N refers to the number of transmissions.

Optionally, the processor 1200, when configured for
selecting the initial-transmission resource for the to-be-
transmitted data among the candidate transmission
resources, is particularly configured for:

selecting the initial-transmission resource among the can-
didate transmission resources according to a DRX
active time of the second terminal after a time instant
n, wherein n is an arrival time of the to-be-transmitted
data, or n is a triggering time of resource selection or
re-selection.

Optionally, the processor 1200, when configured for
selecting the N−1 retransmission resources for the to-be-
transmitted data among the candidate transmission
resources, is configured for:

determining an active time of a DRX retransmission timer
that is expected to be started by the second terminal according to the initial-transmission resource that is selected and/or the DRX configuration parameters; and selecting the retransmission resources among the candidate transmission resources according to an active time of the second terminal, wherein the active time comprises at least the active time of the DRX retransmission timer that is expected to be started by the second terminal.

Optionally, the processor 1200, when configured for selecting the N−1 retransmission resources for the to-be-transmitted data among the candidate transmission resources, is configured for:

determining an active time of a DRX retransmission timer that is expected to be started by the second terminal according to the retransmission resources that are selected and/or the DRX configuration parameters; and selecting the retransmission resources among the candidate transmission resources according to an active time of the second terminal, wherein the active time comprises at least the active time of the DRX retransmission timer that is expected to be started by the second terminal.

Optionally, the processor 1200, when configured for, selecting N transmission resources for the to-be-transmitted data among the candidate transmission resources, is particularly configured for:

selecting N transmission resources among the candidate transmission resources;

according to the N transmission resources and/or the DRX configuration parameters, determining an active time of a DRX retransmission timer that is expected to be started by the second terminal;

if at least M transmission resources among the N transmission resources are located within the active time of the second terminal, determining the N transmission resources to be the transmission resources for transmitting the to-be-transmitted data, wherein the active time comprises at least the N−1 active times; and if at least M transmission resources among the N transmission resources are not located within the active time, re-selecting N transmission resources among the candidate transmission resources;

wherein M is a positive integer smaller than or equal to N.

Optionally, the candidate transmission resources selected for the to-be-transmitted data in the resource selection window by the processor 1200 include:

Y candidate slots, wherein at least some of the Y candidate slots are located within a DRX active time of the second terminal after a time instant n, and Y is greater than or equal to a minimum number of candidate slots that are configured by a network or pre-configured; or N candidate-transmission-resource groups, wherein a first candidate-transmission-resource group is located within a DRX active time of the second terminal after a time instant n;

wherein N refers to the number of transmissions, and n is an arrival time of the to-be-transmitted data, or n is a triggering time of resource selection or re-selection.

Optionally, if the candidate transmission resources include the Y candidate slots, the processor 1200, when configured for, according to a number of transmissions of to-be-transmitted data, Discontinuous Reception DRX configuration parameters of a second terminal and resource-pool configuration parameters of the second terminal, selecting candidate transmission resources for the to-be-transmitted data in a resource selection window, is particularly configured for:

determining a time-domain starting position of the candidate transmission resources as n+T1+X, wherein n+T1+X is located within the DRX active time of the second terminal after the time instant n, n+T1 is a starting time of the resource selection window, and X is a first slot interval.

Optionally, if the candidate transmission resources include the N candidate-transmission-resource groups, the processor 1200, when configured for, according to a number of transmissions of to-be-transmitted data, Discontinuous Reception DRX configuration parameters of a second terminal and resource-pool configuration parameters of the second terminal, selecting candidate transmission resources for the to-be-transmitted data in a resource selection window, is particularly configured for:

determining a time-domain starting position of the first candidate-transmission-resource group as n+T1+X, wherein the first candidate-transmission-resource group is located within the DRX active time of the second terminal after the time instant n, n+T1 is a starting time of the resource selection window, and X is a first slot interval;

according to the DRX configuration parameters and the resource-pool configuration parameters, determining the other N−1 candidate-transmission-resource groups than the first candidate-transmission-resource group; and if it is determined that the last slot of an N-th candidate-transmission-resource group exceeds an ending time of the resource selection window, adjusting at least one of the following parameters:

a quantity of slots within the candidate-transmission-resource groups;

slot intervals between two neighboring instances of the candidate-transmission-resource groups; and a starting position of the first candidate-transmission-resource group.

Optionally, if the candidate transmission resources include Y candidate slots, the processor 1200, when configured for, selecting the transmission resource for the to-be-transmitted data among the candidate transmission resources according to the DRX configuration parameters, is configured for:

selecting one initial-transmission resource among the candidate transmission resources, wherein the initial-transmission resource is located within a DRX active time of the second terminal after a time instant n; and selecting N−1 retransmission resources among the candidate transmission resources, wherein the retransmission resources are located within an active time of the second terminal, and the active time is a time duration that is decided according to the DRX configuration parameters.

Optionally, if the candidate transmission resources include N candidate-transmission-resource groups, the processor 1200, when configured for, selecting the transmission resource for the to-be-transmitted data among the candidate transmission resources according to the DRX configuration parameters, is particularly configured for:

selecting one initial-transmission resource from a first candidate-transmission-resource group; and selecting N−1 retransmission resources from N−1 candidate-transmission-resource groups other than the first candidate-transmission-resource group, wherein the retransmission resources are located within an active time of the second terminal, and the active time is a time duration that is decided according to the DRX configuration parameters.

Optionally, if the candidate transmission resources include Y candidate slots, the processor 1200, when configured for, selecting the transmission resource for the to-be-transmitted data among the candidate transmission resources according to the DRX configuration parameters, is particularly configured for:

selecting N transmission resources from the Y candidate slots;

if at least M transmission resources among the N transmission resources are located within an active time of the second terminal, determining the N transmission resources to be the transmission resources for transmitting the to-be-transmitted data, wherein the active time is a time duration that is decided according to the DRX configuration parameters and/or the N transmission resources; and if at least M transmission resources among the N transmission resources are not located within the active time, re-selecting N transmission resources from the Y candidate slots;

wherein M is a positive integer smaller than or equal to N.

Optionally, if the candidate transmission resources include N candidate-transmission-resource groups, the processor 1200, when configured for, selecting the transmission resource for the to-be-transmitted data among the candidate transmission resources according to the DRX configuration parameters, is particularly configured for:

selecting one transmission resource from each of candidate-transmission-resource groups;

if at least M transmission resources among N transmission resources are located within an active time of the second terminal, determining the N transmission resources to be the transmission resources for transmitting the to-be-transmitted data, wherein the active time is a time duration that is decided according to the DRX configuration parameters and/or the N transmission resources; and if at least M transmission resources among the N transmission resources are not located within the active time, re-selecting one transmission resource from each of the candidate-transmission-resource groups;

wherein M is a positive integer smaller than or equal to N.

The terminal according to the embodiments of the present disclosure, firstly, according to the number of transmissions of the to-be-transmitted data, the Discontinuous Reception DRX configuration parameters of the second terminal and the resource-pool configuration parameters of the second terminal, selects the candidate transmission resources for the to-be-transmitted data in the resource selection window; and secondly, according to the DRX configuration parameters, among the candidate transmission resources, selects the transmission resource for the to-be-transmitted data. Accordingly, when the first terminal is selecting the transmission resource for the to-be-transmitted data, the DRX configuration of the second terminal is sufficiently taken into consideration, so that the selected transmission resource is within the active time of the second terminal, thereby reducing packet loss in the process of data transmission, whereby the terminal can ensure the reliable transmission of the data transmission while reducing the power consumption.

A person skilled in the art can understand that all or some of the steps for implementing the above embodiment may be completed by hardware, and may also be completed by a computer program instructing relevant hardware, wherein the computer program contains an instruction for executing some or all of the steps of the above method, the computer program may be stored in a readable storage medium, and the storage medium may be a storage medium in any form.

Furthermore, an embodiment of the present disclosure further provides a computer-readable storage medium, wherein the readable storage medium stores a program, and the program, when executed by a processor, implements the steps of the embodiments of the method for selecting a transmission resource stated above, to obtain the same technical effect, which, in order to avoid replication, is not discussed herein further. The computer-readable storage medium is, for example, a Read-Only Memory (referred to for short as ROM), a Random Access Memory (referred to for short as RAM), a diskette and an optical disk.

In addition, it should be noted that, in the apparatus and the method according to the present disclosure, obviously, the components or the steps may be disassembled and/or recombined. Those disassembling and/or recombination should be deemed as equivalent solutions of the present disclosure. Moreover, the steps performing the above serial processing may be naturally executed according to the sequence of description or according to the time sequence, and are not necessarily required to be executed according to the time sequence, wherein some of the steps may be executed parallelly or independently of each other. A person skilled in the art can understand that all or any of the steps or the components of the method and the apparatus according to the present disclosure may, in any computing device (including a processor, a storage medium and so on) or a network of computing devices, be implemented as hardware, firmware, software or a combination thereof, which is implementable by a person skilled in the art after reading the description of the present disclosure by using his basic programing skill.

Therefore, the purpose of the present disclosure may also be realized by executing a program or a set of programs in any computing device. The computing device may be a well-known generic device. Therefore, the purpose of the present disclosure may also be realized by merely providing a program product containing a program code implementing the method or the apparatus. In other words, such a program product also constitutes the present disclosure, and a storage medium storing such a program product also can constitute the present disclosure. Obviously, the storage medium may be any well-known storage medium or any storage medium that will be developed in the future.

A person skilled in the art can envisage that the units and the algorithm steps of the examples described with reference to the embodiments disclosed herein may be implemented by using electronic hardware or a combination of computer software and electronic hardware. Whether those functions are executed by hardware or software depends on the particular applications and the design constraints of the technical solutions. A person skilled in the art may employ different methods to implement the described functions with respect to each of the particular applications, but the implementations should not be considered as extending beyond the scope of the present disclosure.

A person skilled in the art can clearly understand that, in order for the convenience and concision of the description, the particular working processes of the above-described systems, devices and units may refer to the corresponding processes according to the above-described process embodiments, and are not discussed herein further.

In the embodiments of the present application, it should be understood that the disclosed apparatus and method may be implemented in other manners. For example, the above-described device embodiments are merely illustrative. For example, the division between the units is merely a division in the logic functions, and in the actual implementation there may be another mode of division. For example, multiple units or components may be combined or may be integrated into another system, or some of the features may be omitted, or not implemented.

Additionally, the coupling or direct coupling or communicative connection between the illustrated or discussed components may be via interfaces or the indirect coupling or communicative connection between the devices or units, and may be electric, mechanical or in other forms.

The units that are described as separate components may or may not be physically separate, and the components that are displayed as units may or may not be physical units; in other words, they may be located at the same one location, and may also be distributed to a plurality of network units. Some or all of the units may be selected according to actual demands to realize the purposes of the solutions of the embodiments.

Furthermore, the functional units according to the embodiments of the present disclosure may be integrated into one processing unit, or the units may also separately physically exist, or two or more of the units may also be integrated into one unit.

The functions, if implemented in the form of software function units and sold or used as an independent product, may be stored in a computer-readable storage medium. On the basis of such a comprehension, the substance of the technical solutions of the present disclosure, or the part thereof that makes a contribution over the prior art, or part of the technical solutions, may be embodied in the form of a software product. The computer software product is stored in a storage medium, and contains multiple instructions configured so that a computer device (which may be a personal computer, a server, a network device and so on) implements all or some of the steps of the methods according to the embodiments of the present disclosure. Moreover, the storage medium includes various media that can store a program code, such as a USB flash disk, a mobile hard disk drive, a ROM, a RAM, a diskette and an optical disk.

A person skilled in the art can understand that all or some of the processes of the methods according to the above embodiments may be implemented by relative hardware under the controlling by a computer program, the program may be stored in a computer-readable storage medium, and the program, when executed, may contain the processes of the embodiments of the method stated above. The storage medium may be a diskette, an optical disk, a Read-Only Memory (ROM), a Random Access Memory (RAM) and so on.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The above-described are preferable embodiments of the present disclosure. It should be noted that a person skilled in the art may make various improvements without departing from the principle of the present disclosure, wherein those improvements should be considered as falling within the protection scope of the present disclosure.

The invention claimed is:

1. A method for selecting a transmission resource, applied to a first terminal, wherein the method comprises:
according to a number of transmissions of to-be-transmitted data, Discontinuous Reception (DRX) configuration parameters of a second terminal and resource-pool configuration parameters of the second terminal, selecting candidate transmission resources for the to-be-transmitted data in a resource selection window; and
selecting the transmission resource for the to-be-transmitted data among the candidate transmission resources according to the DRX configuration parameters;
wherein the step of selecting the transmission resource for the to-be-transmitted data among the candidate transmission resources according to the DRX configuration parameters comprises:
selecting an initial-transmission resource and N−1 retransmission resources for the to-be-transmitted data among the candidate transmission resources; wherein N refers to the number of transmissions;
wherein the step of selecting the N−1 retransmission resources for the to-be-transmitted data among the candidate transmission resources comprises:
determining an active time duration of a DRX retransmission timer that is expected to be started by the second terminal according to the initial-transmission resource that is selected and the DRX configuration parameters; and
selecting the retransmission resources among the candidate transmission resources according to an active time of the second terminal, wherein the active time comprises at least the active time duration of the DRX retransmission timer that is expected to be started by the second terminal.

2. The method according to claim 1, wherein the step of selecting the initial-transmission resource for the to-be-transmitted data among the candidate transmission resources comprises:
selecting the initial-transmission resource among the candidate transmission resources according to a DRX active time of the second terminal after a time instant n, wherein n is an arrival time of the to-be-transmitted data, or n is a triggering time of resource selection or re-selection.

3. The method according to claim 1, wherein the step of selecting the N−1 retransmission resources for the to-be-transmitted data among the candidate transmission resources comprises:
determining an active time duration of a DRX retransmission timer that is expected to be started by the second terminal according to the retransmission resources that are selected and the DRX configuration parameters; and
selecting the retransmission resources among the candidate transmission resources according to an active time of the second terminal, wherein the active time comprises at least the active time duration of the DRX retransmission timer that is expected to be started by the second terminal.

4. The method according to claim 1, wherein the step of selecting the N transmission resources for the to-be-transmitted data among the candidate transmission resources comprises:

selecting N transmission resources among the candidate transmission resources;

according to the N transmission resources and the DRX configuration parameters, determining an active time duration of a DRX retransmission timer that is expected to be started by the second terminal;

if at least M transmission resources among the N transmission resources are located within the active time of the second terminal, determining the N transmission resources to be the transmission resources for transmitting the to-be-transmitted data, wherein the active time comprises at least the N−1 active time durations; and if at least M transmission resources among the N transmission resources are not located within the active time, re-selecting N transmission resources among the candidate transmission resources;

wherein M is a positive integer smaller than or equal to N.

5. The method according to claim 1, wherein the candidate transmission resources comprise:

Y candidate slots, wherein at least some of the Y candidate slots are located within a DRX active time of the second terminal after a time instant n, and Y is greater than or equal to a minimum number of candidate slots that are configured by a network or pre-configured.

6. The method according to claim 5, wherein the step of, according to the number of transmissions of the to-be-transmitted data, the Discontinuous Reception (DRX) configuration parameters of the second terminal and the resource-pool configuration parameters of the second terminal, selecting the candidate transmission resources for the to-be-transmitted data in the resource selection window comprises:

determining a time-domain starting position of the candidate transmission resources as n+T1+X, wherein n+T1+X is located within the DRX active time of the second terminal after the time instant n, n+T1 is the starting time of the resource selection window, and X is a first slot interval.

7. The method according to claim 1, wherein if the candidate transmission resources comprise Y candidate slots, the step of selecting the transmission resource for the to-be-transmitted data among the candidate transmission resources according to the DRX configuration parameters comprises:

selecting one initial-transmission resource among the candidate transmission resources, wherein the initial-transmission resource is located within a DRX active time of the second terminal after a time instant n; and selecting N−1 retransmission resources among the candidate transmission resources, wherein the retransmission resources are located within an active time of the second terminal, and the active time is a time duration that is decided according to the DRX configuration parameters.

8. The method according to claim 1, wherein if the candidate transmission resources comprise N candidate-transmission-resource groups, the step of selecting the transmission resource for the to-be-transmitted data among the candidate transmission resources according to the DRX configuration parameters comprises:

selecting one initial-transmission resource from a first candidate-transmission-resource group; and selecting N−1 retransmission resources from N−1 candidate-transmission-resource groups other than the first candidate-transmission-resource group, wherein the retransmission resources are located within an active time of the second terminal, and the active time is a time duration that is decided according to the DRX configuration parameters.

9. The method according to claim 1, wherein if the candidate transmission resources comprise Y candidate slots, the step of selecting the transmission resource for the to-be-transmitted data among the candidate transmission resources according to the DRX configuration parameters comprises:

selecting N transmission resources from the Y candidate slots;

if at least M transmission resources among the N transmission resources are located within an active time of the second terminal, determining the N transmission resources to be the transmission resources for transmitting the to-be-transmitted data, wherein the active time is a time duration that is decided according to the DRX configuration parameters and the N transmission resources; and if at least M transmission resources among the N transmission resources are not located within the active time, re-selecting N transmission resources from the Y candidate slots;

wherein M is a positive integer smaller than or equal to N.

10. The method according to claim 1, wherein if the candidate transmission resources comprise N candidate-transmission-resource groups, the step of selecting the transmission resource for the to-be-transmitted data among the candidate transmission resources according to the DRX configuration parameters comprises:

selecting one transmission resource from each of candidate-transmission-resource groups;

if at least M transmission resources among N transmission resources are located within an active time of the second terminal, determining the N transmission resources to be the transmission resources for transmitting the to-be-transmitted data, wherein the active time duration is a time duration that is decided according to the DRX configuration parameters and the N transmission resources; and if at least M transmission resources among the N transmission resources are not located within the active time, re-selecting one transmission resource from each of the candidate-transmission-resource groups;

wherein M is a positive integer smaller than or equal to N.

11. A non-transitory computer-readable storage medium, wherein the computer-readable storage medium stores a computer program, and the computer program, when executed by a processor, implements the steps of the method for selecting a transmission resource according to claim 1.

12. The method according to claim 1, wherein the candidate transmission resources comprise:

N candidate-transmission-resource groups, wherein a first candidate-transmission-resource group is located within the DRX active time of the second terminal after the time instant n;

wherein N refers to the number of transmissions, and n is an arrival time of the to-be-transmitted data, or n is a triggering time of resource selection or re-selection.

13. The method according to claim 12, wherein the step of, according to the number of transmissions of the to-be-transmitted data, the Discontinuous Reception (DRX) configuration parameters of the second terminal and the resource-pool configuration parameters of the second terminal, selecting the candidate transmission resources for the to-be-transmitted data in the resource selection window comprises:

determining a time-domain starting position of the first candidate-transmission-resource group as n+T1+X, wherein the first candidate-transmission-resource group is located within the DRX active time of the second terminal after the time instant n, n+T1 is a starting time of the resource selection window, and X is a first slot interval;

according to the DRX configuration parameters and the resource-pool configuration parameters, determining the other N−1 candidate-transmission-resource groups than the first candidate-transmission-resource group; and if it is determined that the last slot of an N-th candidate-transmission-resource group exceeds an ending time of the resource selection window, adjusting at least one of the following parameters:

a number of slots within the candidate-transmission-resource groups;

slot intervals between two neighboring instances of the candidate-transmission-resource groups; and a starting position of the first candidate-transmission-resource group.

14. A terminal, wherein the terminal is a first terminal, and comprises a transceiver, a memory, a processor and a computer program stored in the memory and executed in the processor, and the processor, when executing the computer program, implements the operations comprising:

according to a number of transmissions of to-be-transmitted data, Discontinuous Reception (DRX) configuration parameters of a second terminal and resource-pool configuration parameters of the second terminal, selecting candidate transmission resources for the to-be-transmitted data in a resource selection window; and selecting the transmission resource for the to-be-transmitted data among the candidate transmission resources according to the DRX configuration parameters;

wherein the operation of selecting the transmission resource for the to-be-transmitted data among the candidate transmission resources according to the DRX configuration parameters comprises:

selecting an initial-transmission resource and N−1 retransmission resources for the to-be-transmitted data among the candidate transmission resources;

wherein N refers to the number of transmissions;

wherein the operation of selecting the N−1 retransmission resources for the to-be-transmitted data among the candidate transmission resources comprises:

determining an active time duration of a DRX retransmission timer that is expected to be started by the second terminal according to the initial-transmission resource that is selected and the DRX configuration parameters; and selecting the retransmission resources among the candidate transmission resources according to an active time of the second terminal, wherein the active time comprises at least the active time duration of the DRX retransmission timer that is expected to be started by the second terminal.

15. The terminal according to claim 14, wherein the candidate transmission resources comprise:

Y candidate slots, wherein at least some of the Y candidate slots are located within a DRX active time of the second terminal after a time instant n, and Y is greater than or equal to a minimum number of candidate slots that are configured by a network or pre-configured.

16. The terminal according to claim 14, wherein the operation of selecting the transmission resource for the to-be-transmitted data among the candidate transmission resources according to the DRX configuration parameters comprises:

selecting one initial-transmission resource among the candidate transmission resources, wherein the initial-transmission resource is located within a DRX active time of the second terminal after a time instant n; and selecting N−1 retransmission resources among the candidate transmission resources, wherein the retransmission resources are located within an active time of the second terminal, and the active time is a time duration that is decided according to the DRX configuration parameters.

17. The terminal according to claim 14, wherein the operation of selecting the transmission resource for the to-be-transmitted data among the candidate transmission resources according to the DRX configuration parameters comprises:

selecting N transmission resources from the Y candidate slots;

if at least M transmission resources among the N transmission resources are located within an active time of the second terminal, determining the N transmission resources to be the transmission resources for transmitting the to-be-transmitted data, wherein the active time is a time duration that is decided according to the DRX configuration parameters and/or the N transmission resources; and if at least M transmission resources among the N transmission resources are not located within the active time, re-selecting N transmission resources from the Y candidate slots;

wherein M is a positive integer smaller than or equal to N.

* * * * *